United States Patent
Cheng et al.

(10) Patent No.: US 12,137,510 B2
(45) Date of Patent: Nov. 5, 2024

(54) POWER DENSITY EMISSION MANIPULATION IN A COOKING INSTRUMENT

(71) Applicant: Brava Home, Inc., Redwood City, CA (US)

(72) Inventors: Shih-Yu Cheng, Union City, CA (US); Dennis Denker, Scottsdale, AZ (US); Zinovy Dolgonosov, San Francisco, CA (US); Carl Grossman, Redwood City, CA (US); Kuy Mainwaring, Menlo Park, CA (US)

(73) Assignee: Brava Home, Inc., Redwood City, CA (US)

( * ) Notice: Subject to any disclaimer, the term of this patent is extended or adjusted under 35 U.S.C. 154(b) by 507 days.

(21) Appl. No.: 16/181,269

(22) Filed: Nov. 5, 2018

(65) Prior Publication Data
US 2019/0141798 A1 May 9, 2019

Related U.S. Application Data

(60) Provisional application No. 62/695,755, filed on Jul. 9, 2018, provisional application No. 62/582,265, filed on Nov. 6, 2017.

(51) Int. Cl.
*H05B 6/68* (2006.01)
*H05B 6/64* (2006.01)
*F27D 21/02* (2006.01)

(52) U.S. Cl.
CPC .......... *H05B 6/687* (2013.01); *H05B 6/6408* (2013.01); *H05B 6/6435* (2013.01); *H05B 6/645* (2013.01);
(Continued)

(58) Field of Classification Search
CPC .... H05B 6/687; H05B 6/6408; H05B 6/6435; H05B 6/645; H05B 6/6494; F27D 2021/026
(Continued)

(56) References Cited

U.S. PATENT DOCUMENTS 3,407,285 A 10/1968 Jacobs
4,117,294 A 9/1978 Appelquist et al.
(Continued)

FOREIGN PATENT DOCUMENTS

CN 1127868 A 7/1996
CN 101398197 4/2009
(Continued)

OTHER PUBLICATIONS

Wikipedia page to "Rotisserie" (Year: 2005).*
Wayback Machine for Wikipedia page to "Rotisserie" (Year: 2005).*

*Primary Examiner* — Sang Y Paik
*Assistant Examiner* — Bonita Khlok
(74) *Attorney, Agent, or Firm* — Haynes and Boone, LLP

(57) ABSTRACT

Several embodiments include a cooking instrument. The cooking instrument can include a heating system. The heating system can include one or more heating elements capable of emitting wireless energy into the cooking chamber. The cooking instrument can also include a control system. The control system can select a quantifiable cooking result and drive the heating system to achieve such cooking result. In at least one mode of operation, the control system can increase power density despite a power draw limit of an external power source.

22 Claims, 18 Drawing Sheets

(52) U.S. Cl.
CPC ..... H05B 6/6494 (2013.01); *F27D 2021/026* (2013.01)

(58) Field of Classification Search
USPC ....... 219/678, 679, 680, 681, 685, 702, 704, 219/705, 709, 710, 711, 716, 717
See application file for complete search history.

(56) References Cited

U.S. PATENT DOCUMENTS

| | | | |
|---|---|---|---|
| 4,335,293 | A | 6/1982 | Kobayashi et al. |
| 4,473,732 | A | 9/1984 | Payne |
| 4,475,024 | A | 10/1984 | Tateda et al. |
| 4,771,154 | A | 9/1988 | Bell et al. |
| 4,800,090 | A | 1/1989 | August |
| 5,349,163 | A | 9/1994 | An |
| 5,665,259 | A | 9/1997 | Westerberg |
| 5,990,454 | A | 11/1999 | Westerberg et al. |
| 6,011,242 | A | 1/2000 | Westerberg |
| 6,013,900 | A | 1/2000 | Westerberg et al. |
| 6,069,345 | A | 5/2000 | Westerberg |
| 6,302,095 | B1 | 10/2001 | Tolley et al. |
| 6,417,494 | B1 * | 7/2002 | Westerberg .......... H05B 3/0076 219/402 |
| 6,843,207 | B2 | 1/2005 | Kanzaki et al. |
| 7,075,442 | B2 | 7/2006 | Lion et al. |
| 7,323,663 | B2 * | 1/2008 | Cavada ..................... F24C 7/04 392/416 |
| 7,619,186 | B2 * | 11/2009 | Cavada .................. F24C 7/082 219/412 |
| 7,683,292 | B2 | 3/2010 | Cavada et al. |
| 8,200,548 | B2 | 6/2012 | Wiedl |
| 8,791,398 | B2 | 7/2014 | De la Cuerda Ortin et al. |
| 8,929,724 | B1 | 1/2015 | Mograbi |
| 9,414,444 | B2 | 8/2016 | Libman et al. |
| 9,460,633 | B2 | 10/2016 | Minvielle |
| 9,528,972 | B2 | 12/2016 | Minvielle |
| 9,927,129 | B2 | 3/2018 | Bhogal et al. |
| 2002/0171674 | A1 | 11/2002 | Paris |
| 2005/0173400 | A1 | 8/2005 | Cavada et al. |
| 2006/0289436 | A1 | 12/2006 | Carbone et al. |
| 2008/0259995 | A1 | 10/2008 | Kuhn et al. |
| 2009/0034944 | A1 * | 2/2009 | Burtea ..................... A21B 2/00 392/310 |
| 2009/0102083 | A1 | 4/2009 | Cochran et al. |
| 2009/0272814 | A1 | 11/2009 | Granhed et al. |
| 2010/0186600 | A1 | 7/2010 | Lewis et al. |
| 2010/0199857 | A1 | 8/2010 | Storiz et al. |
| 2010/0288756 | A1 * | 11/2010 | Uchiyama ............ H05B 6/6408 219/756 |
| 2011/0002675 | A1 | 1/2011 | Cochran et al. |
| 2011/0002677 | A1 * | 1/2011 | Cochran ................ H05B 3/148 392/407 |
| 2011/0114627 | A1 | 5/2011 | Burt |
| 2011/0114633 | A1 | 5/2011 | Niklasson et al. |
| 2012/0063753 | A1 | 3/2012 | Cochran et al. |
| 2012/0180775 | A1 | 7/2012 | Waltz et al. |
| 2013/0202754 | A1 | 8/2013 | Cochran et al. |
| 2016/0033140 | A1 | 2/2016 | Weaver, Jr. et al. |
| 2016/0327279 | A1 | 11/2016 | Bhogal et al. |
| 2016/0348918 | A1 | 12/2016 | Bhogal et al. |
| 2017/0074522 | A1 | 3/2017 | Cheng et al. |
| 2017/0099988 | A1 | 4/2017 | Matloubian et al. |
| 2017/0211819 | A1 | 7/2017 | McKee et al. |
| 2017/0215233 | A1 | 7/2017 | Katz et al. |
| 2017/0223774 | A1 | 8/2017 | Cheng et al. |

FOREIGN PATENT DOCUMENTS

| | | |
|---|---|---|
| CN | 102313307 A | 1/2012 |
| CN | 103797894 A | 5/2014 |
| EP | 1740018 | 1/2007 |
| EP | 2515044 | 10/2012 |
| RU | 2006102663 | 8/2007 |
| RU | 2007111953 | 10/2008 |
| RU | 2008111110 | 9/2009 |
| RU | 110892 | 11/2011 |
| WO | WO 98/030941 | 7/1998 |
| WO | WO 2014/086487 | 6/2014 |
| WO | WO 2017/044876 | 3/2017 |

* cited by examiner

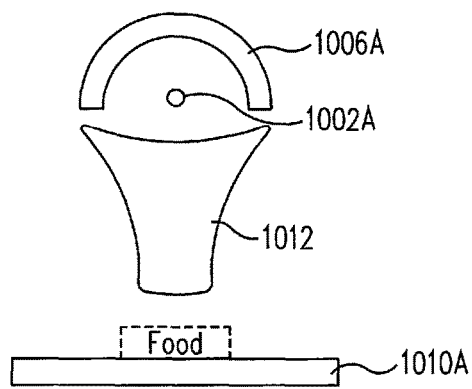
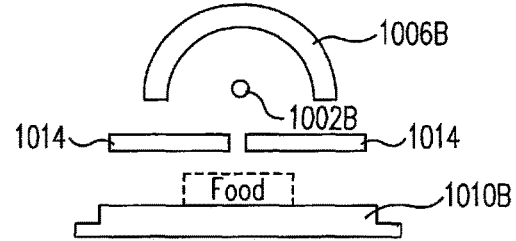
FIG. 10A
FIG. 10B
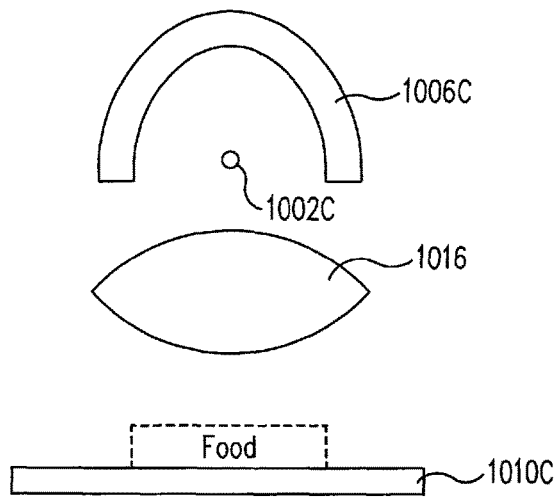
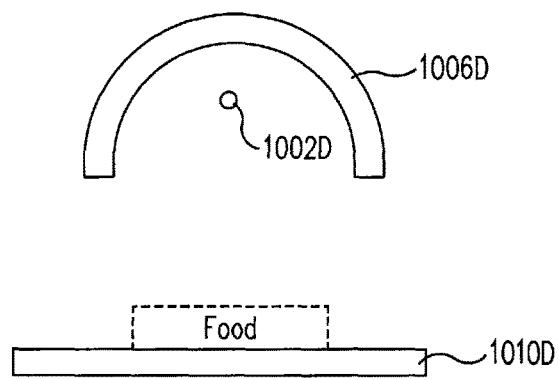
FIG. 10C
FIG. 10D

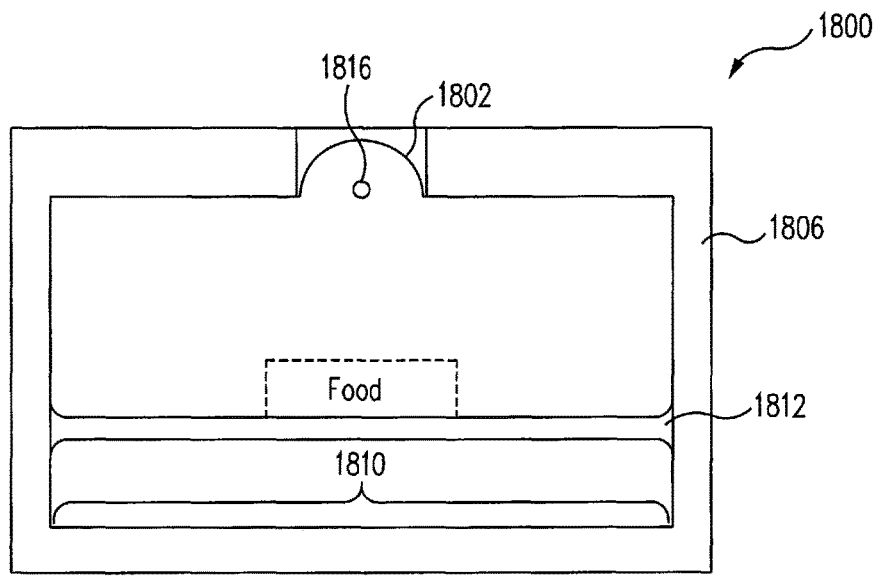
FIG. 18
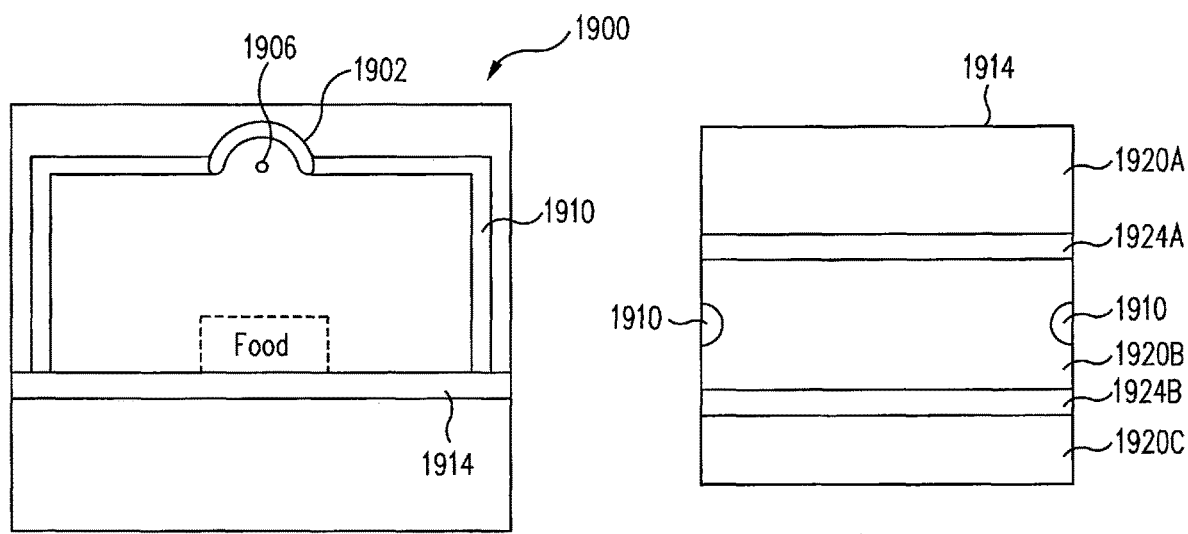
FIG. 19A
FIG. 19B

POWER DENSITY EMISSION MANIPULATION IN A COOKING INSTRUMENT

CROSS-REFERENCE TO RELATED APPLICATIONS

This application claims the benefit of U.S. Provisional Patent Application No. 62/695,755, filed Jul. 9, 2018 and entitled "Power Density Emission Manipulation In A Cooking Instrument" and U.S. Provisional Patent Application No. 62/582,265 filed Nov. 6, 2017 and entitled "Spectral Power Distribution Configurable Cooking Instrument", which are hereby incorporated by reference in their entirety.

TECHNICAL FIELD

Various embodiments relate to cooking instruments, such as ovens.

BACKGROUND

The art of cooking remains an "art" at least partially because of the food industry's inability to help cooks to produce systematically award worthy dishes. To make a full course meal, a cook often has to use multiple cooking instruments, understand the heating patterns of the cooking instruments, and make dynamic decisions throughout the entire cooking process based on the cook's observation of the target food's progression (e.g., transformation due to cooking/heating). Because of this, while some low-end meals can be microwaved (e.g., microwavable meals) or quickly produced (e.g., instant noodles), traditionally, truly complex meals (e.g., steak, kebabs, sophisticated dessert, etc.) cannot be produced systematically using conventional cooking instruments automatically. The industry has not yet been able to create an intelligent cooking instrument capable of automatically and consistently producing complex meals with precision, speed, and lack of unnecessary human intervention.

BRIEF DESCRIPTION OF THE DRAWINGS

FIG. 10A is a cross-sectional diagram that illustrates a heating element aligned with a light pipe, in accordance with various embodiments.

FIG. 10B is a cross-sectional diagram that illustrates a heating element aligned with a diffractive element, in accordance with various embodiments.

FIG. 10C is a cross-sectional diagram that illustrates a heating element aligned with a focusing device, in accordance with various embodiments.

FIG. 10D is a cross-sectional diagram that illustrates a heating element aligned with a reflector device, in accordance with various embodiments.

FIG. 18 is a cross-sectional diagram of a cooking instrument where a reflector is integral with a cooking chamber, in accordance with various embodiments.

FIG. 19A is a cross-sectional view of a cooking instrument having a reflector for a filament assembly that has a thermal conductive structure to facilitate heat transfer to a surface of a cooking platform, in accordance with various embodiments.

FIG. 19B is a top view of the cooking platform of FIG. 19A.

Figure 1:
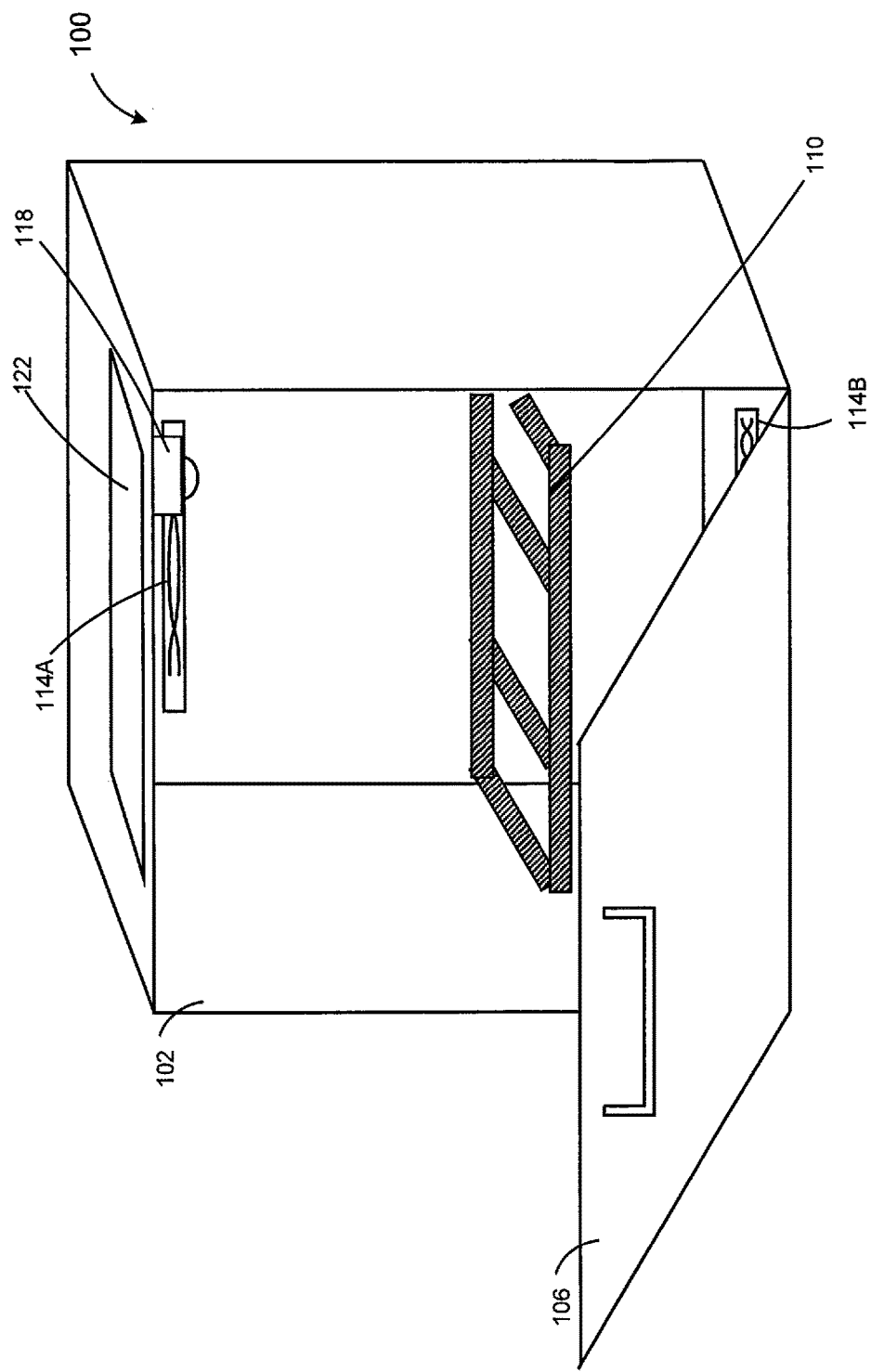
FIG. 1 is a structural diagram of a perspective view of a cooking instrument, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of embodiments described herein.

DETAILED DESCRIPTION

A conventional oven cooks food within its chamber utilizing a single setting over a period of time. Cooking a complex dish (e.g., having multiple components) with such an oven is either restricted by how well cooked all of the components together as a whole is or requires that only a subset of components be cooked at one time in the oven. Disclosed is a cooking instrument capable of applying localized cooking within a cooking chamber, capable of manipulating how the localized cooking is applied to the food (e.g., convection, grilling, contact heating, direct wireless heating, etc.), capable of a quick reaction time to turn on and off the heating, capable of adjusting the temporal distribution of the heating (e.g., creating bursts of heat application), and capable of adjusting the power density of each localized application and/or each temporal burst, or any combination thereof. The heating system of the cooking instrument can emit electromagnetic waves. In cases where the electromagnetic waves substantially penetrate the food, power density herein can mean the amount of power (time rate of energy transfer) per unit volume to a target volume of the food to achieve a quantifiable cooking result. In cases where the electromagnetic waves are substantially absorbed at the surface of the food, power density can mean the surface power density, which is power per unit area (e.g., across a target surface of the target food). In cases where electromagnetic waves are propagating in air, power density herein can mean power per unit area (e.g., across a target surface of the target food) if the food surface were displaced to that location. The target surface can be a three-dimensional surface or a two-dimensional surface. In one example, the cooking instrument can utilize the heating system to generate electromagnetic emission absorbable by a cooking platform and using thermal conduction from the cooking platform to heat the food. In this case, the power density from the heating system can be the two-dimensional surface of the cooking platform.

Several embodiments include a cooking instrument. The cooking instrument can include a heating system. The heating system can include one or more heating elements capable of emitting wireless energy (e.g., electromagnetic emissions) into the cooking chamber. The cooking instrument can also include a control system. The control system can determine a heating sequence to drive the heating system optionally based on measurements. The control system can then execute the heating sequence. The heating sequence can include an instruction to adjust, based on a trigger event, trend, distribution, or function detectable by the control system, the spectral power distribution of wireless waves emitted from a heating element in the heating system. The control system can adjust the spectral power distribution by generating a control signal to a power supply or the heating system to modulate the power provided to the heating element. The spectral power distribution can be a function of temperature of the heating element. By driving the temperature of the heating element to a target range and maintaining the temperature within the target range by the proper electrical power application, the cooking instrument can tune the spectral power distribution of the heating element.

A cooking instrument can produce desirable cooking results if it is capable of precisely controlling its output power density, output power spectrum, the power transfer pathway to the target food, and how heat moves within the food. However, the total amount of power available to a heating system of the cooking instrument may be limited by the electrical supply to the cooking instrument. To achieve the desired cooking outcome, the cooking instrument has to create a high power density using limited available source power. In some cases, limited available source power means limited available electrical current or voltage from an external power source. This can be achieved by selecting a power transfer pathway that transfers more of the power provided from the heating system to the food compared to another power transfer pathway, managing temperature of one or more heating elements in the heating system, mechanically moving at least a portion of the heating system, mechanically moving at least a portion of the food, inducing a particular temperature distribution in the food, cooking platform, or chamber, or any combination thereof.

In some embodiments, the cooking instrument achieves this by using optical elements that concentrate, focus, or modify the uniformity of power, limit the area of exposure (e.g., of the food within the cooking chamber) to the wireless electromagnetic power generated by the heating system of the cooking instrument. In this disclosure, optical elements include passive, active, or dynamic structures or devices that changes the wireless electromagnetic emission, such as intensity, direction, and/or spectral distribution of the electromagnetic emission. For example, optical elements can include focusing devices (e.g., devices capable of concentrating electromagnetic waves), reflectors, diffractive elements, light pipes, other electromagnetic wave/light bending technologies, or any combination thereof. In some embodiments, the cooking instrument can achieve the necessary high power density to the food by adjusting the distribution of electrical power to only a fraction of the total available energy-emitting components or only a fraction of the total available energy-emitting area. In some embodiments, the cooking instrument can achieve the necessary high power density to the food by moving at least a portion of the heating system towards a food or by moving at least a portion of the food toward the heating system.

One method of maximizing the conversion of power to that which is usable for cooking is to create heating elements with high emissivity in the direction of the area requiring the application of heat and low emissivity in other directions. This can be achieved with the filament of a heating element (e.g., with different material coating on the filament) or with an optical component, such as a reflector, a focusing device, etc.

Application of high power density is sometimes insufficient to achieve the desirable cooking result because continuous application of high power density cooking can have a drying effect on the target food. Hence, it is advantageous for the cooking instrument to drive its heating system to have a reaction time that is as fast as possible when achieving maximum radiant output given limitations of its source power and that is able to return to low temperatures as rapidly as possible when the driving power is stopped.

Limiting area of exposure or focusing to achieve high power density sometimes has the issue of spatial non-uniformity perpendicular to the surface of the food (e.g., and hence creating a large change in applied power with regard to changes in for surface distances from the heating elements). When electromagnetic emission is uniform perpendicular to a surface of the food, changes in thickness of the food would have minimal impact on the recipe/heating sequence used by the control system. In several embodiments, the cooking instrument advantageously creates spatially uniform emission of wireless electromagnetic power to cook the target food. In some embodiments, the cooking instrument achieves spatial uniformity in its emission via optical elements capable of bending the wireless electromagnetic emissions.

In achieving high power density, non-uniformity can occur at different places on the surface of the food. Rapid spatial changes in power density parallel to the surface can create hot spots and non-uniformity in surface cook quality. In some embodiments, the cooking instrument can achieve spatial uniformity by utilizing more than one heating element to cook the same target food. In other embodiments, the cooking instrument achieves spatial uniformity via optical elements capable of bending the wireless electromagnetic emissions.

Another aspect to consider when using high power density cooking is that, to achieve certain chemical reactions or surface qualities on the food, it may be advantageous to create high power for only a short portion of the cook. In some embodiments, the cooking instrument creates short bursts of high power electromagnetic waves that are localized and reverts to generating lower power electromagnetic waves in other stages of the cook. In some embodiments, the cooking instrument has one or more heating elements that naturally emit from a surface area that grows over time. For example, some filaments may not start emitting electromagnetic waves until it is hot enough. Hence, in those embodiments, the heating system can initially heat up one portion of the filament that slowly over time heat up other portions of the filament to start emitting.

Yet another aspect to consider when using high power density cooking is that, when applying electromagnetic power to food, some energy applied to the food can result in undesirable effects, such as burning or drying the food. In several embodiments, the cooking instrument advantageously provides a control system capable of managing the application of electromagnetic power spatially and/or temporally to minimize these drying/burning effects and maximize those associated with reaching the desirable cooking results.

FIG. 1 is a structural diagram of a perspective view of a cooking instrument 100, in accordance with various embodiments. The cooking instrument 100 can include a chamber 102 having a door 106. At least one cooking platform 110 is disposed inside the chamber 102. The cooking platform 110 can be a tray, a rack, or any combination thereof.

The cooking instrument 100 can include a heating system (not labeled in FIG. 1). The heating system can include one or more heating elements 114 (e.g., a heating element 114A, a heating element 114B, etc., collectively as the "heating elements 114"). The chamber 102 can be lined with the heating elements 114. Each of heating elements 114 can include a wavelength controllable filament assembly. The wavelength controllable filament assembly is capable of independently adjusting an emission spectral power distribution (hence also peak frequency and peak wavelength), emission power, and/or emission signal pattern in response to a command from a computing device (not shown) of the cooking instrument 100.

In several embodiments, the chamber 102 is windowless. That is, the chamber 102, including the door 106, is entirely enclosed without any transparent (and/or semitransparent) parts when the door 106 is closed. For example, the chamber 102 can be sealed within a metal enclosure (e.g., with thermal insulation from/to the outside of the chamber 102) when the door 106 is closed. A camera 118 can be attached to an interior of the chamber 102. In some embodiments, the camera 118 is attached to the door 106. For example, the camera 118 can face inward toward the interior of the chamber 102 when the door 106 is closed and upward when the door 106 is opened as illustrated. In some embodiments, the camera 118 is installed on the ceiling (e.g., top interior surface) of the chamber 102. The camera 118 can be attached to the door 106 or proximate (e.g., within three inches) to the door 106 on the ceiling of the chamber 102 to enable easy cleaning, convenient scanning of labels, privacy, heat damage avoidance, etc.

In several embodiments, each of the heating elements 114 includes one or more wavelength-controllable filament assemblies at one or more locations in the chamber. In some embodiments, each of the one or more wavelength-controllable filament assemblies is capable of independently adjusting its emission spectral power distribution (e.g., peak emission frequency) and/or its emission power. For example, the peak emission frequency of the wavelength-controllable filament assemblies can be tuned within a broad band range (e.g. from 20 terahertz to 300 terahertz). Different frequencies can correspond to different penetration depth for heating the food substances, the cooking platform 110 or other items within the chamber 102, and/or parts of the cooking instrument 100.

The heating elements 114 can be controlled to have varying power, either by using a rapidly switching pulse width modulation (PWM)-like or phase cutting-like electronics that turns on and off relatively quickly compared to the thermal inertia of the heating filament itself. The change in peak emission frequency can be directly correlated with the amount of power delivered into the heating element. More power correlates to higher peak emission frequency. In some cases, the cooking instrument 100 can hold the power constant while lowering the peak emission frequency by activating more heating elements, each at a lower power. The cooking instrument 100 can independently control peak emission frequencies of the filament assemblies and power them by driving these filament assemblies individually.

In some embodiments, using the max power for each individual heating element to achieve the highest emission frequency is challenging because the power consumption may be insufficiently supplied by the AC power supply (e.g., because it would trip the fuse). In some embodiments, this is resolved by sequentially driving each individual heating element at maximum power instead of driving them in parallel with reduced power. Intermediate peak emission frequency can be achieved by having a combination of sequential driving and parallel driving.

In some embodiments, the camera 118 includes an infrared sensor to provide thermal images to the computing device as feedback to a dynamic heating sequence (e.g., a heat adjustment algorithm). In some embodiments, the cooking instrument 100 includes multiple cameras. In some embodiments, the camera 118 includes a protective shell. In some embodiments, the heating elements 114 and the camera 118 are disposed in the chamber 102 such that the camera 118 is not directly between any pairing of the heating elements. For example, the heating elements 114 can be disposed along two vertical walls perpendicular to the door 106. The heating elements 114 can be quartz tubes (e.g., with heating filaments therein) that run horizontally on the vertical walls and perpendicular to the door 106.

In some embodiments, a display 122 is attached to the door 106. In some embodiments, the display 122 is attached to an outward-facing surface of the chamber 102 other than the door 106 (as shown). The display 122 can be a touchscreen display. The display 122 can be attached to an exterior of the chamber 102 on an opposite side of the door 106 from the camera 118. The display 122 can be configured to display a real-time image or a real-time video of the interior of the chamber captured by and/or streamed from the camera 118.

Figure 2:
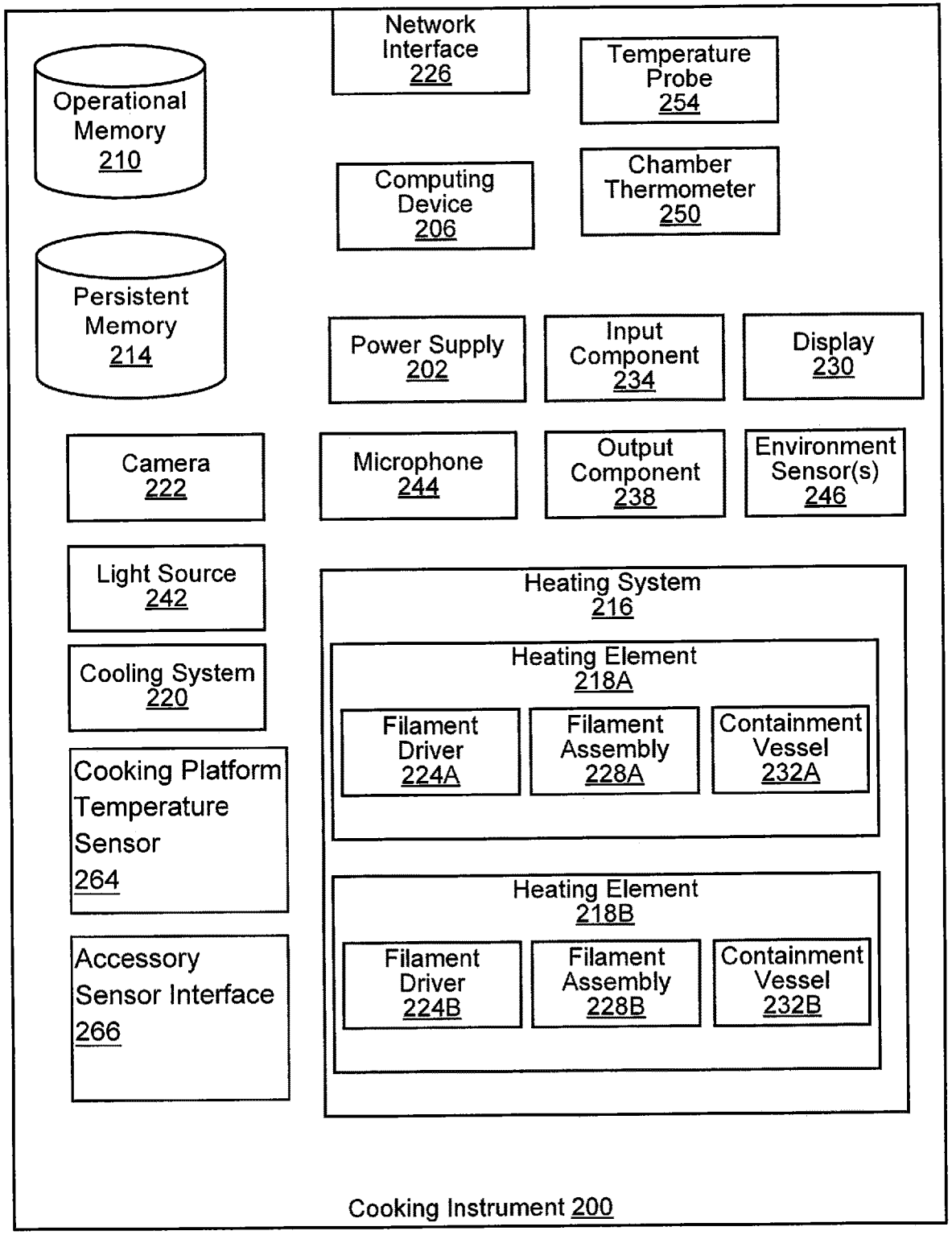
FIG. 2 is a block diagram illustrating physical components of a cooking instrument, in accordance with various embodiments.

FIG. 2 is a block diagram illustrating physical components of a cooking instrument 200 (e.g., the cooking instrument 100), in accordance with various embodiments. The cooking instrument 200 can include a power supply 202, a computing device 206, an operational memory 210, a persistent memory 214, a heating system 216 with one or more heating elements (e.g., a heating element 218A, a heating element 218B, etc., collectively as the "heating elements 218"), a cooling system 220, a camera 222 (e.g., the camera 118), a network interface 226, a display 230 (e.g., the display 122), an input component 234, an output component 238, a light source 242, a microphone 244, one or more environment sensors 246, a chamber thermometer 250, a temperature probe 254, or any combination thereof. The heating elements 218 can be the heating elements 114. In some embodiments, each of the heating elements 218 is individually tunable (e.g., by the computing device 206) to change its emission spectral power distribution independent of others.

The computing device 206, for example, can be a control circuit. The computing device 206 serves as the control system for the cooking instrument 200. The control circuit can be an application-specific integrated circuit or a circuit with a general-purpose processor configured by executable instructions stored in the operational memory 210 and/or the persistent memory 214. The computing device 206 can control all or at least a subset of the physical components and/or functional components of the cooking instrument 200.

The power supply 202 provides the power necessary to operate the physical components of the cooking instrument 200. For example, the power supply 202 can convert alternating current (AC) power to direct current (DC) power for the physical components. In some embodiments, the power supply 202 can run a first powertrain to the heating elements 218 and a second powertrain to the other components. In some cases, the first powertrain is an AC powertrain and the second powertrain is a DC powertrain.

The computing device 206 can control peak wavelengths and/or spectral power distributions (e.g., across different wavelengths) of the heating elements 218. The computing device 206 can implement various functional components (e.g., see FIG. 3) to facilitate operations (e.g., automated or semi-automated operations) of the cooking instrument 200. For example, the persistent memory 214 can store one or more cooking recipes. Each cooking recipe can include one or more heating sequences containing executable instructions (e.g., executable by the computing device 206) to drive the heating elements 218. The operational memory 210 can provide runtime memory to execute the functional components of the computing device 206. In some embodiments, the persistent memory 214 and/or the operational memory 210 can store image files or video files captured by the camera 222.

The heating elements 218 can be wavelength controllable (e.g., capable of changing its spectral power distribution). For example, the heating elements 218 can include quartz tubes, each enclosing one or more heating filaments. In various embodiments, the side of the quartz tubes facing toward the chamber wall instead of the interior of the chamber is coated with a heat resistant coating. The operating temperature of the heating filaments can be extremely high. Hence, the cooling system 220 can provide cooling (e.g., convectional or otherwise) to prevent the heat resistant coating from melting or vaporizing.

The heating elements 218 can respectively include filament drivers (e.g., respectively a filament driver 224A and a filament driver 224B, collectively as the "filament drivers 224"), filament assemblies (e.g., respectively filament assembly 228A and filament assembly 228B, collectively as the "filament assemblies 228B"), and containment vessels (e.g., respectively containment vessel 232A and containment vessel 232B, collectively as the "containment vessels 232"). For example, each heating element can include a filament assembly housed by a containment vessel. The filament assembly can be driven by a filament driver. In turn, the filament driver can be controlled by the computing device 206. For example, the computing device 206 can instruct the power supply 202 to provide a set amount of power to the filament driver. In turn, the computing device 206 can instruct the filament driver to drive the filament assembly to generate electromagnetic waves (i.e., a form of wireless electromagnetic energy) with one or more selected peak wavelengths and/or other particular characteristics defining a spectral power distribution type.

The camera 222 serves various functions in the operation of the cooking instrument 200. For example, the camera 222 and the display 230 together can provide a virtual window to the inside of the chamber despite the cooking instrument 200 being windowless. The camera 222 can serve as a food package label scanner that configures the cooking instrument 200 by recognizing a machine-readable optical label of the food packages. In some embodiments, the camera 222 can enable the computing device 206 to use optical feedback when executing a cooking recipe. In several embodiments, the light source 242 can illuminate the interior of the cooking instrument 200 such that the camera 222 can clearly capture an image of the food substance therein.

The network interface 226 enables the computing device 206 to communicate with external computing devices. For example, the network interface 226 can enable Wi-Fi or Bluetooth. A user device can connect with the computing device 206 directly via the network interface 226 or indirectly via a router or other network devices. The network interface 226 can connect the computing device 206 to an external device with Internet connection, such as a router or a cellular device. In turn, the computing device 206 can have access to a cloud service over the Internet connection. In some embodiments, the network interface 226 can provide cellular access to the Internet.

The display 230, the input component 234, and the output component 238 enable a user to directly interact with the functional components of the computing device 206. For example, the display 230 can present images from the camera 222. The display 230 can also present a control interface implemented by the computing device 206. The input component 234 can be a touch panel overlaid with the display 230 (e.g., collectively as a touchscreen display). In some embodiments, the input component 234 is one or more mechanical devices (e.g., buttons, dials, switches, or any combination thereof). In some embodiments, the output component 238 is the display 230. In some embodiments, the output component 238 is a speaker or one or more external lights.

In some embodiments, the cooking instrument 200 includes the microphone 244, and/or the one or more environment sensors 246. For example, the computing device 206 can utilize the audio signal, similar to images from the camera 222, from the microphone 244 as dynamic feedback to adjust the controls of the heating elements 218 in real-time according to a heat adjustment algorithm (e.g., a part of a dynamic heating sequence). In one example, the computing device 206 can detect an audio signal indicative of a fire alarm, a smoke alarm, popcorn being popped, or any combination thereof. For example, the computing device 206 can adjust the heating system 216 according to the detected audio signal, such as turning off the heating elements 218 in response to detecting an alarm or in response to detecting a series of popcorn noise followed by silence/low noise. The environment sensors 246 can include a pressure sensor, a humidity sensor, a smoke sensor, a pollutant sensor, or any combination thereof. The computing device 206 can also utilize the outputs of the environment sensors 246 as dynamic feedback to adjust the controls of the heating elements 218 in real-time according to a heating sequence instruction (e.g., a heat adjustment algorithm).

In some embodiments, the cooking instrument 200 includes the chamber thermometer 250, the temperature probe 254, a cooking platform temperature sensor 264, an accessory sensor interface 266, or any combination thereof. The cooking platform temperature sensor 264 can measure the temperature at one or more zones on a cooking platform (e.g., the cooking platform 110). The cooking platform temperature sensor 264 can be embedded in or attached to the cooking platform. The accessory sensor interface 266 can be a wired or wireless interface capable of receiving sensor signals from an accessory of the cooking instrument 200. For example, an accessory (not shown) can include a temperature sensor that reports the temperature experienced at the accessory to the computing device 206. For example, the computing device 206 can utilize the temperature readings from the chamber thermometer 250, the temperature probe 254, the cooking platform temperature sensor 264, the accessory sensor interface 266, or any combination thereof, as dynamic feedback to adjust the controls of the heating elements 218 in real-time according to a heat adjustment algorithm. The temperature probe 254 can be adapted to be inserted into food to be cooked by the cooking instrument 200. The computing device 206 can also utilize the outputs of the temperature probe 254 as dynamic feedback to adjust the controls of the heating elements 218 in real-time according to a heat adjustment algorithm. For example, the heat adjustment algorithm of a cooking recipe can dictate that the food should be heated at a preset temperature for a preset amount time according to the cooking recipe.

In some embodiments, the cooling system 220 includes one or more devices to mix or move air. Air can be moved within the chamber, the oven, or between the oven and the external environment. In some cases, the cooling system 220 can include an air exhaust that moves air outside of the cooking chamber. In some embodiments a convection fan can move air across food surfaces to promote cook. In some embodiments fans can move air across heating elements, chamber surfaces, or the cooking platform to promote cook uniformity or accelerate bringing the oven into equilibrium. In some embodiments, air can be moved between the external environment and the interior of the oven to cool the oven enhance recipe control, to reduce oven surface temperatures to prevent injury, and to transport gas and particulate samples to sensors.

Example Implementations

In some example implementations, the heating system 216 includes at least a tunable heating element (e.g., one of the heating elements 218) capable of emitting wireless energy into a cooking chamber (e.g., the cooking chamber 102). To start a process of cooking food, the computing device 206 (e.g., the control system of the cooking instrument 200) can first determine (e.g., identify, select, or infer) a food substance or a food cooking recipe. For example, the computing device 206 can determine the food substance as being in the cooking chamber or intended to be in the cooking chamber. The determination of the food substance can be by image recognition (e.g., using data captured by the camera 222), user input (e.g., using data from the network interface 226 and/or from the input component 234), voice recognition (e.g., using data captured by from a microphone 244), or any combination thereof.

The computing device 206 can be configured to generate, based on an identity of the food substance or the food cooking recipe, a heating sequence to drive the heating system 216. For example, the heating sequence includes or references parameters to determine how to provide power to the tunable heating element to cause the tunable heating element to emit according to a target spectral power distribution. When generating the heating sequence, the target spectral power distribution can be selected to match the absorption spectrum of the food substance or an intermediary cooking medium (e.g., air, cooking platform/tray, water surrounding the food substance, etc.) for cooking the food substance.

In some cases, the computing device 206 can select the food cooking recipe based on identification of food substance by the computing device 206. In some cases, the computing device 206 can infer an expectation of a certain type of food substance to be cooked, in response to receiving a user selection of the food cooking recipe. In some cases, the computing device 206 is configured to generate the heating sequence neither with the identification of food substance nor with an inferred expectation of what food substance is expected to be cooked.

The computing device 206 can be configured to detect trigger events dictated by or specified in one or more heating sequences of one or more food cooking recipes. The trigger can include a measurement crossing a threshold, a time series of measurements fitting some criterion, the passage of time, sensed power application or an combination of these. For example, the logic of the heating sequence can include an instruction to adjust a spectral power distribution of the wireless energy emitted from the tunable heating element in response to the computing device 206 detecting a particular trigger event. After the heating sequence is initiated, the computing device 206 starts to monitor for the detection of the trigger event. In response to detecting the trigger event, the computing device 206 can configure the heating system to adjust the spectral power distribution of the emitted wireless energy from the tunable heating element. In some embodiments, the heating sequence includes an instruction to simultaneously adjust, based on a trigger event detectable by the computing device 206, a plurality of spectral power distributions of wireless waves emitted respectively from the multiple heating elements 218 in the heating system 216. In some cases, the instruction can specify a target spectral power distribution as corresponding to one of the trigger event. In some cases, the instruction can specify a target object category (e.g., defined by foodstuff shape, foodstuff size, foodstuff material, or any combination thereof) associated with the target spectral power distribution as corresponding to one of the trigger event.

In some embodiments, the persistent memory 214 stores a logic function or a database (e.g., a lookup table) that associates target object categories (e.g., defined by material, size, shape, etc.) respectively with wavelength-specific configurations (e.g., each wavelength-specific configuration associated with a target spectral power distribution and/or how to adjust the spectral power distribution to the target spectral power distribution). Instructions in a heating sequence can reference the logic function or the database to identify a wavelength-specific configuration associated with a target spectral power distribution. A wavelength-specific configuration can be associated with a set of one or more parameters that configure the computing device 206 to send a control signal to the heating system 216. The control signal can correspond to characteristics indicative of a target spectral power distribution of waves emitted from the tunable heating element.

A wavelength-specific configuration can be associated with one or more absorbent wavelengths, transmissive wavelengths, or reflective wavelengths of one or more materials in or that are part of the cooking chamber. For example, the materials can include food, glass, metal, air, or any combination thereof. The computing device 206 can be configured to determine that a target foodstuff category (e.g., user-specified, recipe-specified, or image-sensor-identified) or a target intermediary cooking medium is in a target object category and drive the tunable heating element according to the wavelength-specific configuration associated with the target object category according to the database in the persistent memory 214. In some embodiments, the absorptivity characteristic of the target object category allows for multiple wavelength-specific configurations. In those embodiments, a single wavelength-specific configuration can be selected by the computing device 206 to optimize for available power density (e.g., cooking speed) based on the absorptivity band(s) of the target object category.

In some embodiments, aside from adjusting the spectral power distribution, the heating sequence can also include instructions to adjust the intensity, duration, pulse pattern, or any combination thereof, of the wireless energy emitted from the tunable heating element. Execution of the instruction can be dynamic or sequentially timed. That is, the trigger event can be a time-based event, a modeled or simulated event, an event triggered by neural network, a user indicated event, or a sensor data indicated event.

In various embodiments, the spectral power distribution of waves emitted from a tunable heating element is adjusted by modulating power provided to the tunable heating element to tune the temperature of the tunable heating element to a particular range. In some embodiments, the power supply 202 is adapted to supply electrical power to the tunable heating element according to instructions from the computing device 206. The power supply 202 can draw power from an AC wall outlet. For example, the power supply 202 can include an AC power plug adapted to connect with the wall outlet. In some embodiments, the power supply 202 provides pulse modulated or phase-fired control of electrical power to the tunable heating element. For example, the pulse modulated electrical power can be modulated DC power or rectified half-cycle AC power.

Figure 8:
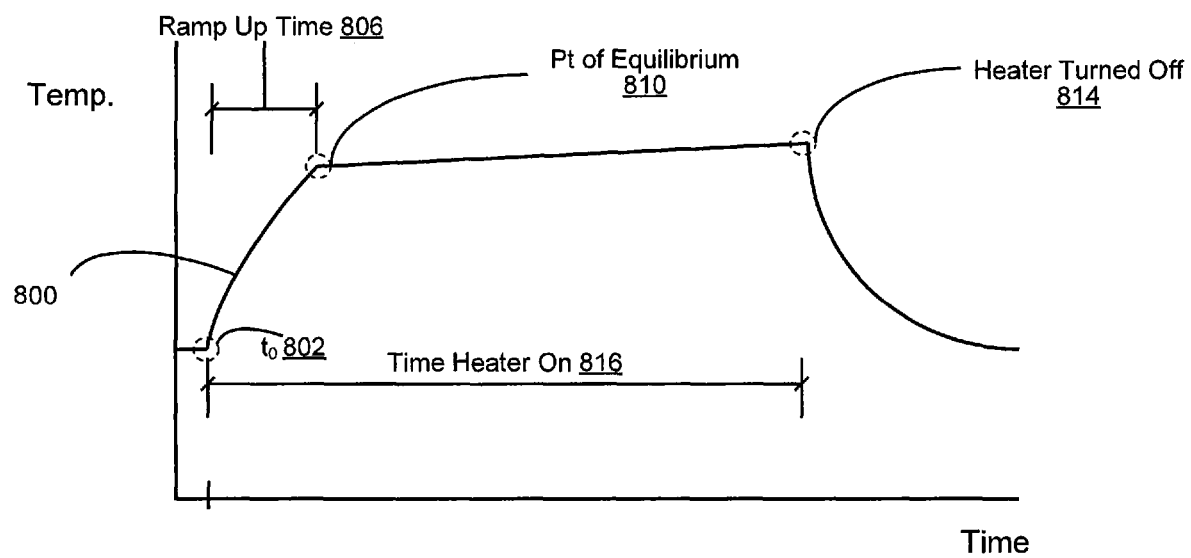
FIG. 8 is a graph illustrating a temperature trace of a heating element over time using an unmodulated method of driving the heating element.

In some cases, the computing device 206 can adjust the spectral power distribution of the tunable heating element by adjusting a duration that the power supply 202 is supplying power to the tunable heating element. For example, the persistent memory 214 can store a driver parameter. The driver parameter can be associated with a target spectral power distribution or at least a characteristic thereof. The driver parameter can be correlated with a variation of the spectral power distribution as a function of time that the tunable heating element is continuous turned on without a substantial pause (e.g., duration of what constitute "substantial pause" can be stored as a parameter as well). The computing device 206 can adjust the duration based on the driver parameter and the known time that the tunable heating element has been continuously turned on. Alternatively, the driver parameter can be correlated with variation to the spectral power distribution as a function of an operational core temperature of the tunable heating element. The computing device 206 can adjust the duration based on the driver parameter and the known operational core temperature of the tunable heating element. The function represented by the driver parameter advantageously enables the computing device 206 to tune the spectral power distribution emitted from a single heating element. The applied power duty cycle in combination with known physical characteristics can be used to estimate operating core temperature of the tunable heating element because temperature increases over time whenever a tunable heating element is connected to electrical power up until equilibrium temperature is reached. Equilibrium is when temperature dissipation is substantially equal and opposite to temperature increase. This effect is illustrated in the graph of FIG. 8.

In some embodiments, the power supply 202 includes a power control mechanism capable of switching power on or off to the tunable heating element. In some embodiments, the power control mechanism is a binary power switch. In some embodiments, the power control mechanism provides more than two states of power connections, such as an off state, a maximum power state, and one or more reduced power states. In these embodiments, the computing device 206 is configured to adjust the spectral power distribution of the tunable heating element to a target spectral power distribution by pulse modulating using the power control mechanism (e.g., according to a control signal from the control system to the power control mechanism). For example, the computing device 206 can pulse modulate the power control mechanism until a target core temperature of the tunable heating element is reached. The persistent memory 214 can store an association between the target spectral power distribution and the target core temperature such that the computing device 206 can determine that they correspond to each other during operation of the heating system 216. The persistent memory 214 can store an association between a pulse modulation configuration (e.g., pulse frequency, pulse width/duty cycle, pulse intensity, or any combination thereof) and a target spectral power distribution.

The computing device 206 can be configured to change the duty cycle of the power control mechanism when an estimated operational temperature of the tunable heating element is above a threshold temperature, when the power control mechanism has been in a particular state for more than a threshold duration, and/or when the power control mechanism has been in a particular state for more than a threshold amount in a preset duration. The particular state can be either an "on" state or an "off state". The changing or slowing the duty cycle can include stopping the pulse modulation. Threshold amount can be measured as a fraction or a percentage within preset duration that the power control mechanism is in the particular state. Similar to the mechanism of slowing, the computing device 206 can be configured to increase the fraction of "on" time in the duty cycle of the power control mechanism when an estimated operational temperature of the tunable heating element is below a threshold temperature, when the power control mechanism has been in a particular state for less than a threshold duration, and/or when the power control mechanism has been in a particular state for less than a threshold amount in a preset duration.

Inrush Current Mitigation

As temperature rapidly rises in the heating element, the electrical resistance of the heating element also rapidly decreases. Accordingly, the electrical current consumed by the heating element at the beginning of electrical pulses may experience a sudden peak. Accordingly, the relay controlling the power connection to the particular heating element can include a temperature dependent circuit element (e.g., temperature dependent resistor) such that the initial rise temperature does not cause an electric current consumption peak that would blow the circuit breaker of the AC power source feeding the heating element.

Power consumption of a filament used in the tunable heating element varies as a function of the temperature of the heating element. The spectral power distribution (SPD) function can be a substantially stateless function over a short time period and a function of temperature during that short time period. Because the temperature of the heating element also increases over time until equilibrium is reached, the SPD function can also be estimated based on the energy balance between emission and applied power. Accordingly, a food cooking recipe with a corresponding heating sequence that changes SPD frequently would require frequent changes to the pulse duty cycle of the pulse modulation. Because the power consumption of a tunable heating element decays over time to an equilibrium whenever the heating element is turned on, frequent switching of the power control mechanism hence corresponds to frequent current draw peaks right when a heating element is turned on. Current draw peaks have the tendency to break the electronic circuitry in the cooking instrument 200.

In some embodiments, the power supply 202 includes a temperature-dependent resistor electronically coupled to the power control mechanism. In some embodiments, the computing device 206 includes a temperature-dependent resistor electronically coupled to the power control mechanism. The temperature-dependent resistor (e.g., a thermistor or a resistor selected for its temperature dependence) can limit in-rush current due to fast switching. In some embodiments, the power supply 202 or the computing device 206 includes a digital power chopper with an adjustable chop rate to limit in-rush current or have higher resolution of the core temperature (e.g., enable the computing device 206 to fine tune the spectral power distribution of the tunable heating element).

Figure 3:
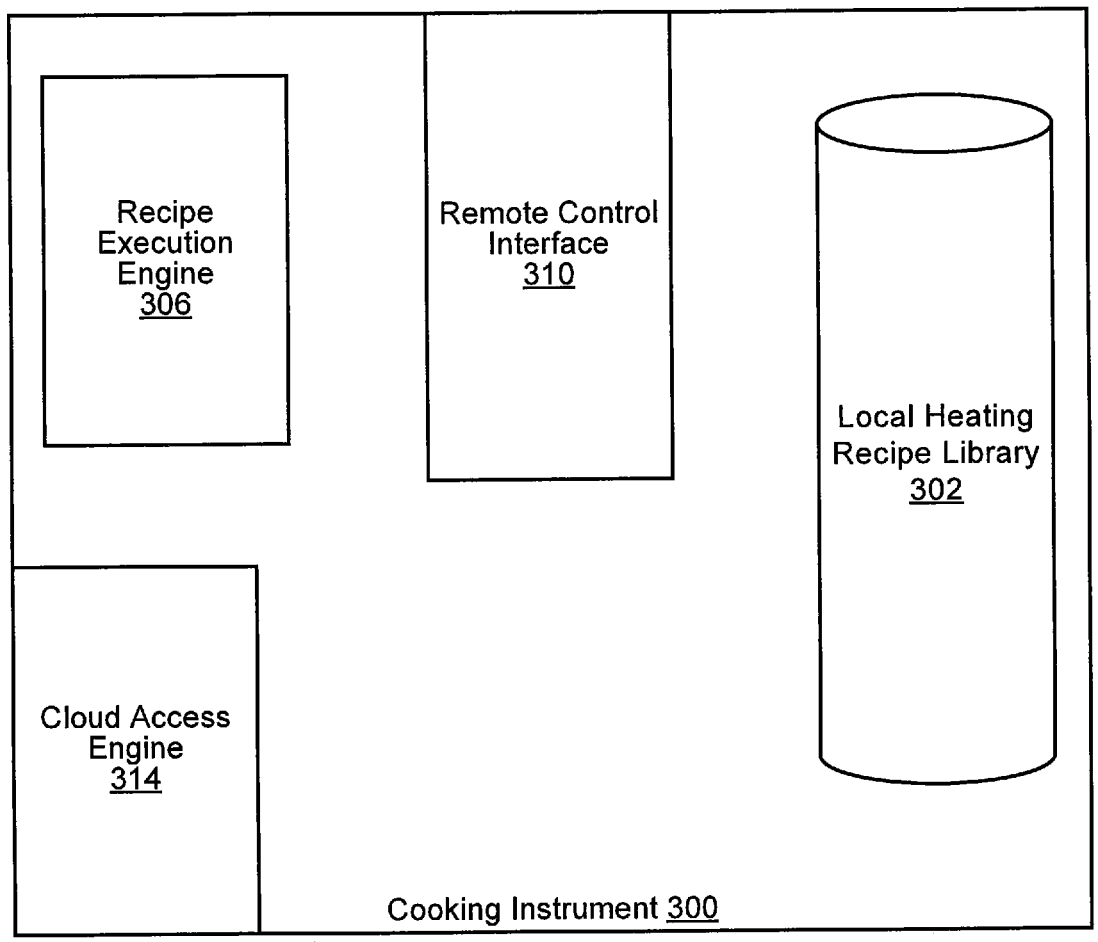
FIG. 3 is a block diagram illustrating functional components of a cooking instrument, in accordance with various embodiments.

FIG. 3 is a block diagram illustrating functional components of a cooking instrument 300 (e.g., the cooking instrument 100 and/or the cooking instrument 200), in accordance with various embodiments. For example, the functional components can run on the computing device 206 or one or more specialized circuits. For example, the cooking instrument 300 can implement at least a cooking recipe library 302, a recipe execution engine 306, a remote control interface 310, a cloud access engine 314, or any combination thereof. The cooking recipe library 302 stores one or more cooking recipes, each cooking recipe including one or more heating sequences respectively for one or more portions of food. The recipe execution engine 306 interprets the executable instructions from the cooking recipes and its heating sequences. The remote control interface 310 enables the functional components of the cooking instrument 300 to be controlled by an external user device (not shown). The remote control interface 310 can enable the external user device to configure the functional components of the cooking instrument 300 or to request information from the external user device. For example, the remote control interface 310 can connect with the external user device via the network interface 226. The cloud access engine 314 enables the cooking instrument 300 to communicate with a backend server system (not shown) to configure the functional components of the cooking instrument 300 or to request information from the backend server system.

In some examples, the recipe execution engine 306 can load and interpret a set of instructions to implement a cooking recipe, including executing a heating sequence (e.g., dynamic segments, static segments, or any combination thereof). For example, the recipe execution engine 306 can analyze an image from a camera (e.g., the camera 222) to determine whether a door (e.g., the door 106) is open. For example, the image from the camera may be illuminated by a specific color of a specific light source (e.g., the light source 242) when facing toward an interior of the cooking instrument 300. In some examples, the recipe execution engine 306 is configured to analyze an image from the camera to determine whether a machine-readable optical label is within the image. For example, the recipe execution engine 306 can be configured to select a cooking recipe from the cooking recipe library 302 based on the machine-readable optical label. In this example, the remote control interface 310 is configured to send a message to an external user device to confirm the automatically selected cooking recipe. In some examples, the recipe execution engine 306 is configured to present the cooking recipe for confirmation on a local display and to receive the confirmation a local input component when the cooking recipe is displayed. In response to the selection of the cooking recipe, the recipe execution engine 306 can execute a heating sequence in accordance of the cooking recipe by controlling the heating elements. The heat adjustment algorithm is capable of dynamically controlling the heating elements 218 (e.g., adjusting output power, spectral power distribution, and/or peak wavelength(s)) in real-time in response to changing input variables (e.g., real-time sensor inputs, user inputs, external user device or backend server system provided parameters, or any combination thereof).

The remote control interface 310 can be used to interact with a user. For example, a user device (e.g., a computer or a mobile device) can connect to the remote control interface via the network interface 226. Via this connection, the user can configure the cooking instrument 300 in real-time. In one example, the user can select a cooking recipe via a user-device-side application running on the user device. The user-device-side application can communicate the remote control interface 310 to cause the cooking instrument 300 to execute the selected cooking recipe. The cloud access engine 314 can enable the cooking instrument 300 to access a cloud service to facilitate execution of a cooking recipe and/or update the cooking recipes in the cooking recipe library 302.

Components (e.g., physical or functional) associated with the cooking instrument (e.g., the cooking instrument 100, the cooking instrument 200, and/or the cooking instrument 300) can be implemented as devices, modules, circuitry, firmware, software, or other functional instructions. For example, the functional components can be implemented in the form of special-purpose circuitry, in the form of one or more appropriately programmed processors, a single board chip, a field programmable gate array, a network-capable computing device, a virtual machine, a cloud computing environment, or any combination thereof. For example, the functional components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified by one component to be accessed in another component. In some embodiments, at least some of the components can be upgraded or modified remotely (e.g., by reconfiguring executable instructions that implements a portion of the functional components). The systems, engines, or devices described herein may include additional, fewer, or different components for various applications.

Figure 4:
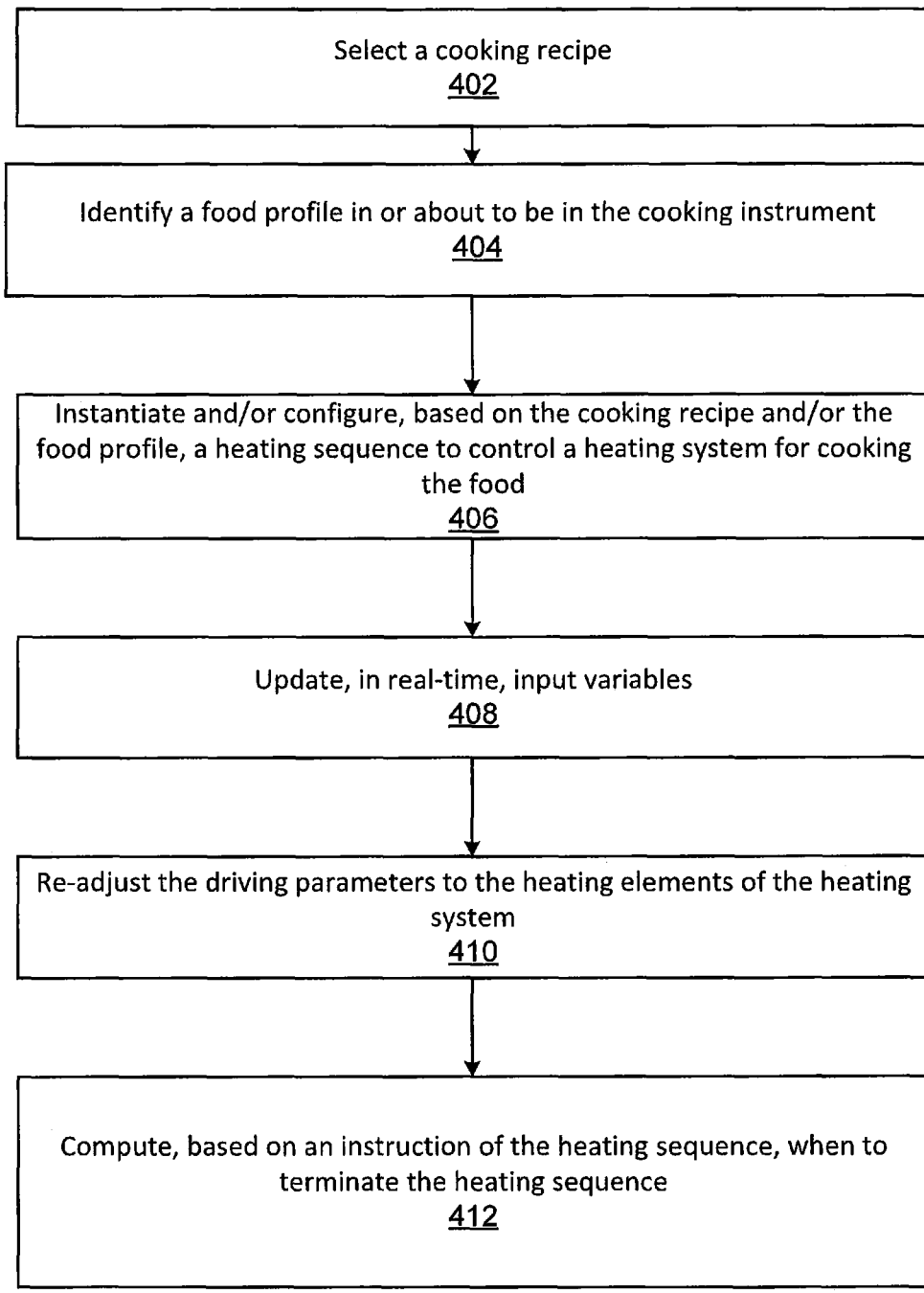
FIG. 4 is a flowchart illustrating a method of operating a cooking instrument to cook food, in accordance with various embodiments.

FIG. 4 is a flowchart illustrating a method 400 of operating the cooking instrument (e.g., the cooking instrument 100, the cooking instrument 200, and/or the cooking instrument 300) to cook food, in accordance with various embodiments. The method 400 can be controlled by a computing device (e.g., the computing device 206).

At step 402, the computing device can select a cooking recipe (e.g., from a local cooking recipe library stored in the local memory (e.g., the operational memory 210 and/or the persistent memory 214) of the computing device and/or the cooking instrument, in an external cooking recipe library implemented by a cloud service accessible through a network interface (e.g., the network interface 226), or in the memory of another external source connected to the computing device). Optionally, at step 404, the computing device can identify a food profile in or about to be in the cooking instrument. For example, the computing device can utilize a camera to identify the food profile (e.g., performing image recognition of the food or scanning a digital label attached to an outer package of the food). The food profile can identify the size of the food, the weight of the food, the shape of the food, the current temperature of the food, or any combination thereof.

At step 406, the computing device can instantiate and/or configure, based on the cooking recipe and/or the food profile, a heating sequence to control a heating system for cooking the food. The heating sequence can include one or more dynamic segments defined by a heat adjustment algorithm. The heat adjustment algorithm can specify how to adjust the driving parameters of one or more heating elements in the cooking instrument based on input variables that may change over time. Input variables can include time lapsed (e.g., time from when the heating elements are first driven and/or when the heating sequence first begins), temperature (e.g., detected by a temperature sensor in the cooking chamber or on the cooking platform) within the cooking instrument, user input (e.g., via an external device connected to the computing device or a control panel of the cooking instrument), temperature within the food (e.g., as reported by a temperature probe inserted into the food and communicatively coupled to the computing device), real-time or asynchronous image analysis of the food, real-time or asynchronous audio signal analysis from a microphone inside or outside of the cooking instrument, real-time or asynchronous environment sensor output analysis, other data received over a network, other data generated by a component of the cooking instrument, or any combination thereof. At step 408, the computing device can update, in real-time, the input variables and, at step 410, re-adjust the driving parameters to the heating elements of the heating system according to the heating sequence and/or the heat adjustment algorithm.

Part of the adjustment made by the heating sequence can include heat intensity, spectral power distribution and/or peak wavelength (e.g., for targeting different food or material within the cooking chamber), heat duration, target zone or cooking platform for heating, or any combination thereof. The computing device can configure the heating elements to apply different heating patterns to different zones (on the same cooking platform or different cooking platforms) in the cooking instrument. Each "zone" can be represented by an area on a cooking platform or a portion of food resting on the cooking platform. The computing device can configure the heating elements to apply, simultaneously or sequentially, different heating patterns to different zones on the cooking platform by supplying different amount of power and/or emission spectral power distributions to different heating elements. The computing device can configure the heating elements to apply different heating patterns to different zones on the cooking platform by driving the heating elements of the heating system at varying peak wavelengths. The cooking instrument can include a perforated metallic sheet between the cooking platform and at least one of the heating elements. The computing device can configure the heating elements to apply different heating patterns to different zones on the cooking platform by using the perforated metallic sheet to spatially block portions of waves emitted by the at least one of the heating elements.

At step 412, the computing device can compute, based on at least an instruction in the heating sequence, when to terminate the heating sequence (e.g., when the cooking instrument stops supplying power to the heating elements). In some embodiments, the heating adjustment algorithm takes into account whether the food is expected to be extracted out of the cooking instrument substantially immediately after the termination of the heating process (e.g., a high-speed mode). For example, the heating adjustment algorithm can shorten the expected termination time if the user indicates that the food will remain in the cooking instrument a preset duration after the termination of the heating process (e.g., a low stress mode).

Figure 5A:
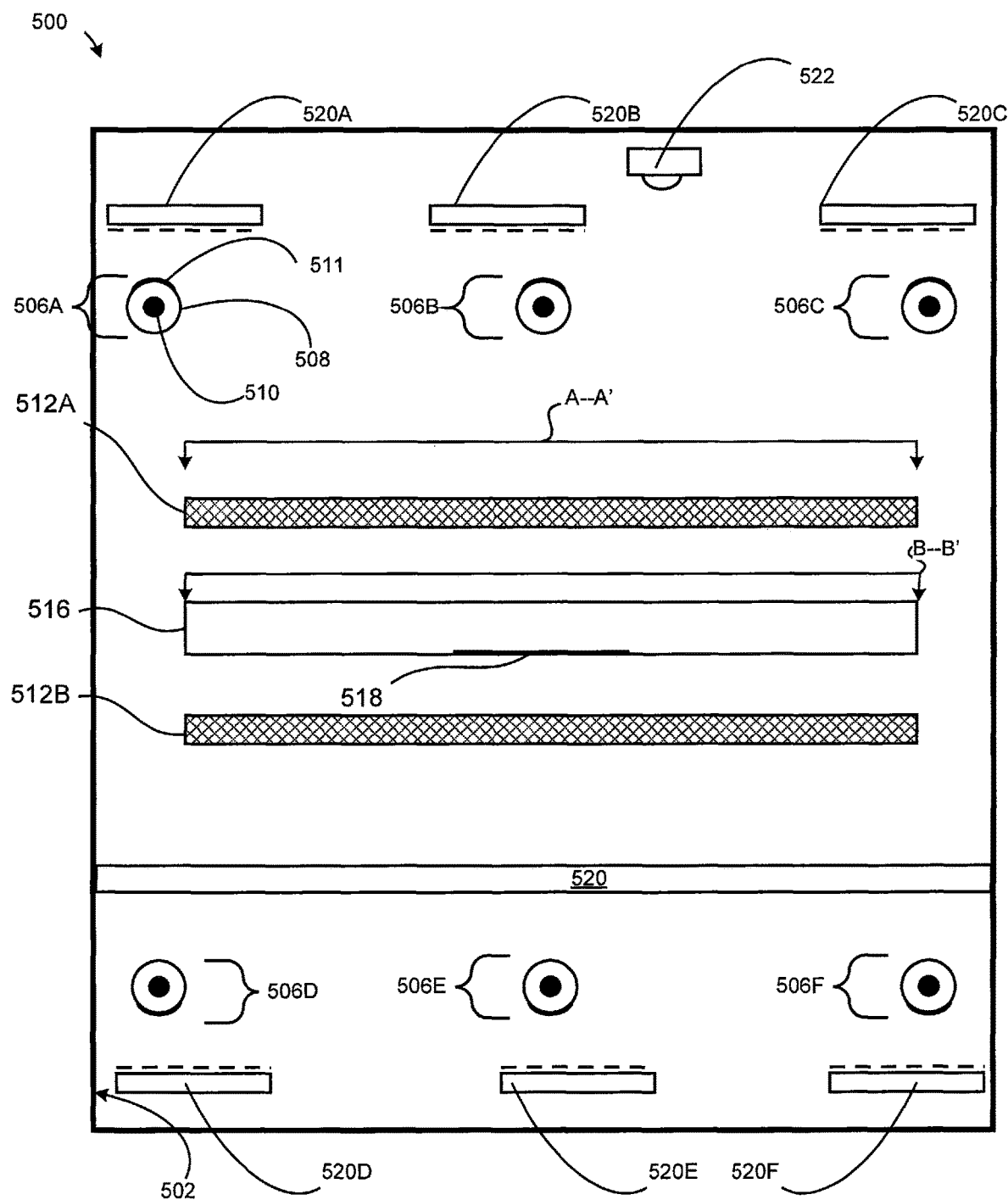
FIG. 5A is a cross-sectional front view of a first example of a cooking instrument, in accordance with various embodiments.

FIG. 5A is a cross-sectional front view of a first example of a cooking instrument 500 (e.g., the cooking instrument 100, the cooking instrument 200, and/or the cooking instrument 300), in accordance with various embodiments. The cooking instrument 500 includes a chamber 502 and a heating system (not labeled in FIG. 5A) with one or more filament assemblies 506 (e.g., a filament assembly 506A, a filament assembly 506B, a filament assembly 506C, a filament assembly 506D, a filament assembly 506E, a filament assembly 506F, etc., collectively as the "filament assemblies 506") at one or more locations in the chamber 502. The filament assemblies 506 can respectively be part of the heating elements of the cooking instrument 500. Each of the filament assemblies 506 can include a containment vessel 508 surrounding a filament 510.

The containment vessel 508 can be coated with reflective material to serve as a reflector 511. This way, the reflector 511 is prevented from being fouled by debris. The containment vessel 508 can be made of quartz. The reflective material can be gold or white ceramics, such as zirconium oxide, silicon oxide, etc. The filament assemblies 506 can be tungsten halogen assemblies. The reflective material can be coated on a portion of an outer surface of each of filament assemblies 506 or the containment vessel 508 that faces away from a cooking platform 516. In some embodiments, the reflector 511 is a separate component than each of the filament assemblies 506 and the containment vessel 508. For example, each of the reflector 511 can be positioned adjacent to each of the filament assemblies 506 away from the center of the cooking chamber. In some embodiments, the reflector 511 is placed close enough to each of the filament assemblies 506 such that during normal operations (e.g., approximately 450 Fahrenheit or above), debris is burnt off between the corresponding reflector 511 and each of the filament assemblies 506. In some embodiments, at least one of the filament assemblies 506 is between the reflector 511 and a glass covering. In some embodiments, a glass covering is between at least one of the filament assemblies 506 and the reflector 511.

In some embodiments, the containment vessel 508 does not need a reflector. In some embodiments, the reflector 511 can be external to the containment vessel 508. Anti-fouling can be achieved by choosing a distance between the reflector 511 (e.g., in the case that it is external to the containment vessel 508) and the containment vessel 508 such that undesirable materials are burnt off the reflector 511 and/or the containment vessel 508. In some embodiments, the reflector 511 and/or the containment vessel 508 can be shielded from debris directly using another (transparent) material. In some embodiments, the filament assemblies 506 each has an end cap made of ceramic substance. The filament 510 can be wounded to dramatically increase total length of filament without increasing the length of the filament assembly. The filament 510 can be wound uniformly or non-uniformly. Ends of the filament 510 can be sealed with molybdenum foil while maintaining electrical conductivity. The filament 510 can be wound with varying diameter or uniform diameter. In some embodiments the filament assemblies 506 (e.g., heating elements) can be connected to a control system through cables. In some embodiments, the filament assemblies 506 can be adapted to be interchangeable to enable quick repairs or to enable substitution of heating elements tailored to the electrical characteristics of the environment.

Figure 5B:
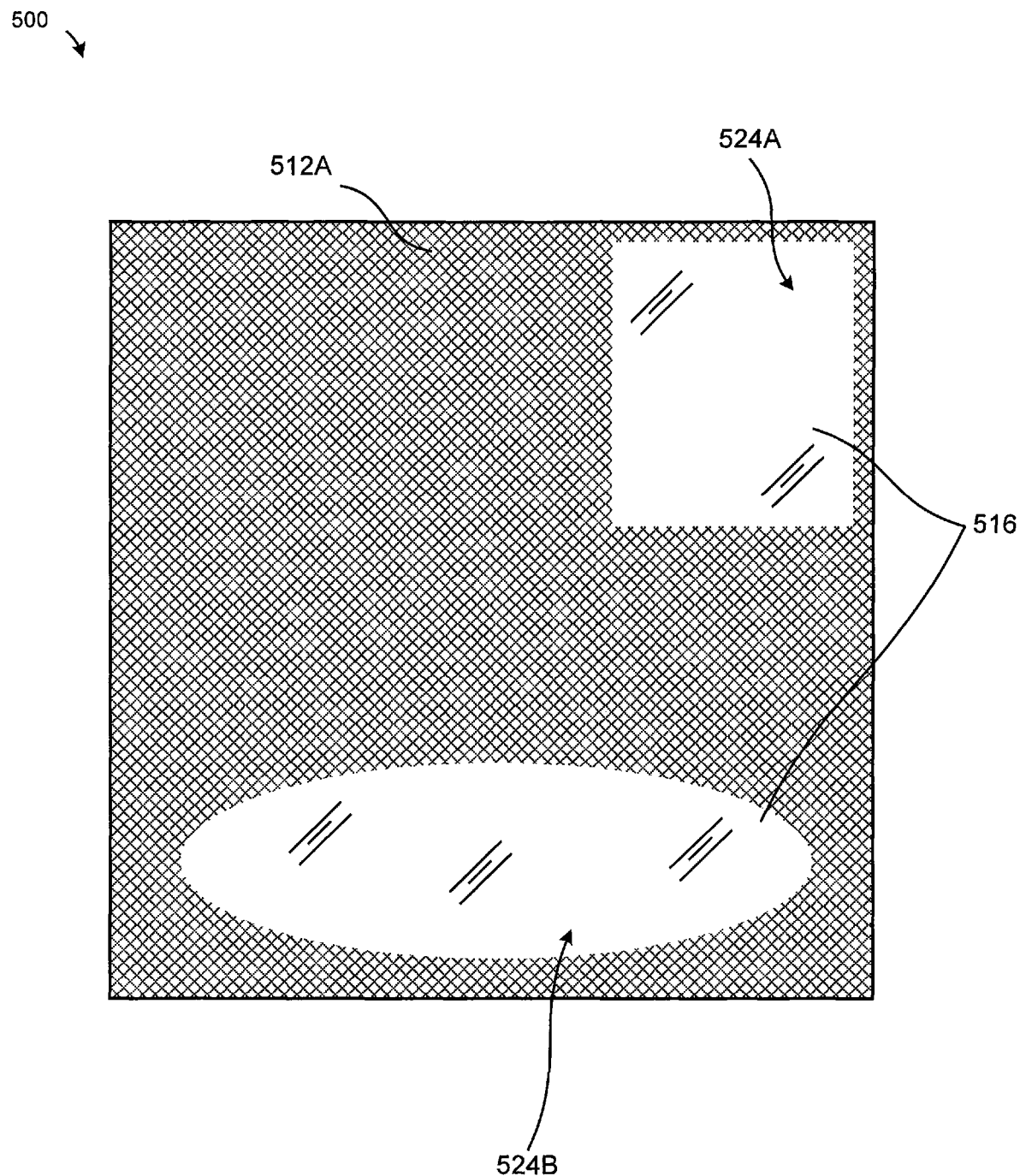
FIG. 5B is a cross-sectional top view of the cooking instrument of FIG. 5A along lines A-A', in accordance with various embodiments.
Figure 5C:
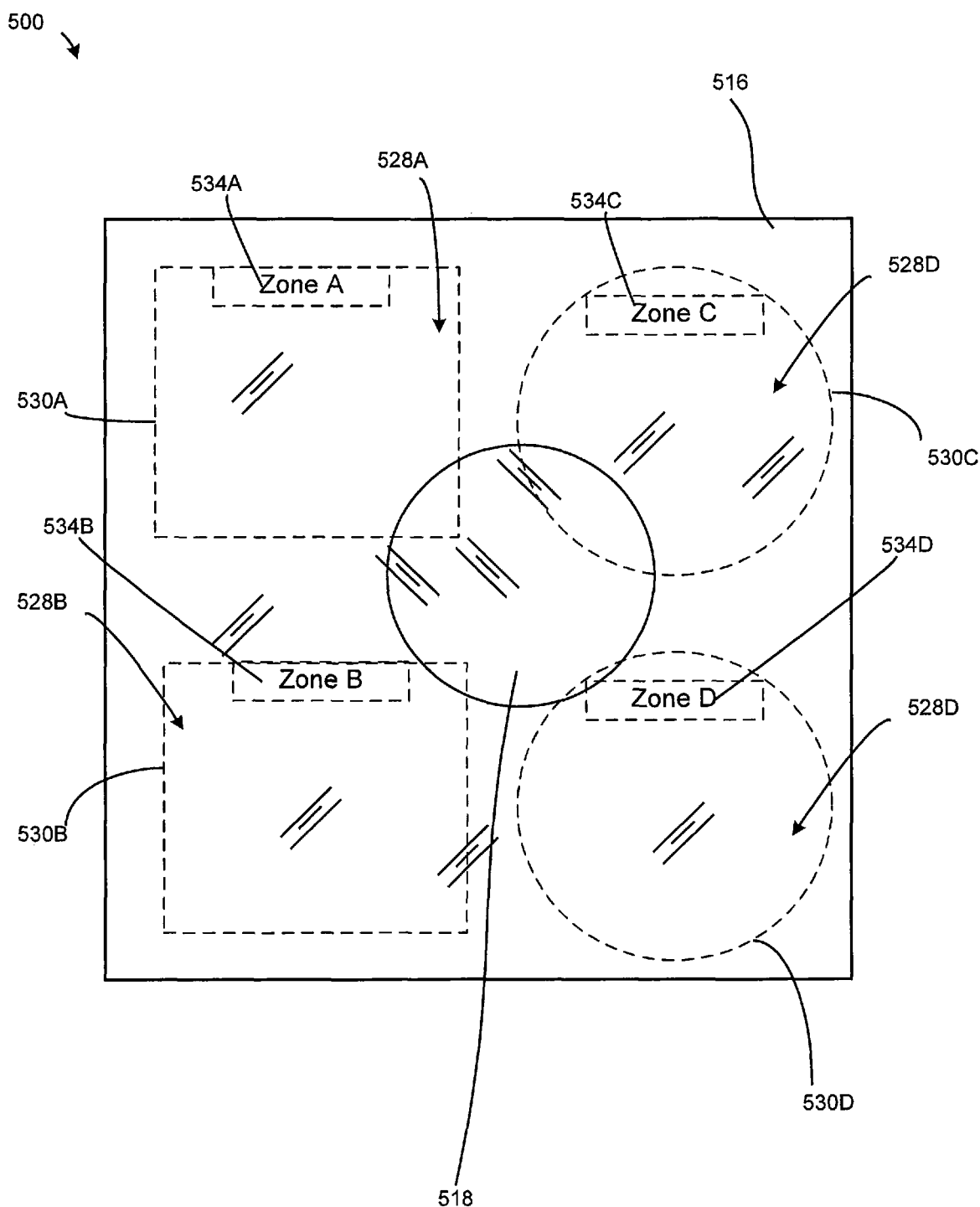
FIG. 5C is a cross-sectional top view of the cooking instrument of FIG. 5A along lines B-B', in accordance with various embodiments.
Figure 5D:
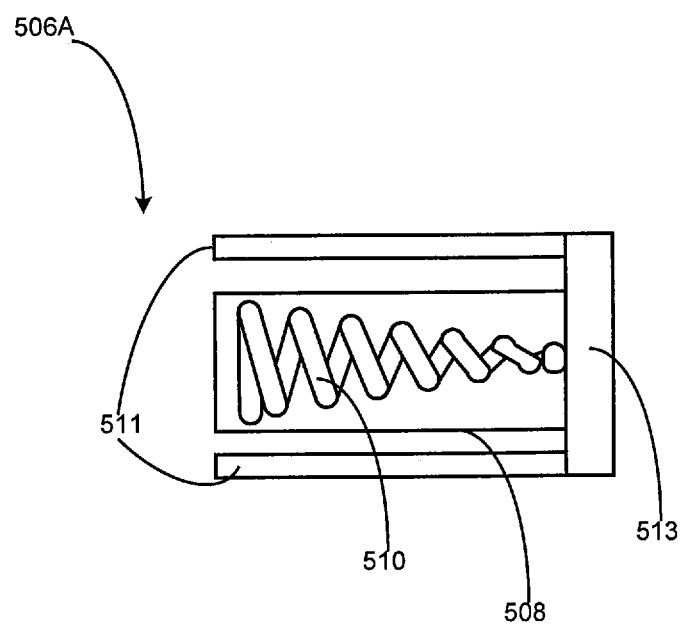
FIG. 5D is an example cross-section of one of the filament assemblies, in accordance with various embodiments.

FIG. 5D is an example cross-section of one of the filament assemblies 506, in accordance with various embodiments. In this example, the filament assembly 506A includes the containment vessel 508 surrounding the filament 510. The filament assembly 506A can include an end cap 513 (e.g., of ceramic substance). The filament 510 can be wounded. The filament assembly 506A can have reflector 511 external to and surrounding the containment vessel 508. In some embodiments, the reflector 511 can be attached to the end cap 513. In some embodiments, the reflector 511 is not attached to the end cap 513 (not shown).

A computing device (e.g., the computing device 206) can be configured to control the emission spectral power distribution (e.g., including one or more peak emission wavelengths) of the filament assemblies 506, individually, in subsets, or as a whole. For example, the computing device can be configured to identify a food profile associated with food (e.g., in the chamber 502) based on sensor input (e.g., camera scanning a label) and/or the user input. The computing device can then determine one or more excitable wavelengths associated with the food profile. For example, the excitable wavelengths can correspond to resonant frequencies of the food material(s) associated with the food profile. The computing device can drive one or more (e.g., a single assembly up to all) of the filament assemblies 506 to emit at a peak emission wavelength corresponding to at least one of the excitable wavelengths to heat the food.

In some embodiments, the chamber 502 is entirely enclosed in metal. In some embodiments, the chamber 502 has the door. In some embodiments, the chamber 502 has one or more transparent windows (e.g., glass windows). In some embodiments, one or more perforated metal sheets 512 (e.g., a perforated metal sheet 512A and/or a perforated metal sheet 512B, collectively as the "perforated metal sheets 512") are disposed within the chamber 502. In some embodiments, there is only a single perforated metal sheet in the chamber 502 (e.g., above the cooking platform 516 or below the cooking platform 516). In some embodiments, there are two perforated metal sheets (as shown). Each of the perforated metal sheets 512 can be a removable or affixed panel. The perforated metal sheets 512 can enable control of heating concentration along a horizontal plane parallel its surface. Perforated metal sheets, such as a perforated aluminum foil, can be used to shield certain food items from the intense radiant heat generated by the filament assemblies 506. For example, when cooking a steak and vegetables side-by-side, the perforated metal sheets can shield the vegetables from being overcooked and enable the steak to receive the full power from the filament assemblies 506. Longer wavelength emission from the filament assemblies 506 can penetrate perforations more equally compared to shorter wavelength. Hence even if the perforations were designed to shield, for example, 90% of direct radiant heat, the cooking instrument can still independently tune the spatial concentration of the heating by varying the wavelength. This enables some control of side-by-side cooking in addition to direct radiant heating.

In some embodiments, the filament assemblies 506 are adapted to emit directional electromagnetic waves. Directionality of the emitted waves can be enabled by the shape and/or location of the reflector 511, the structure, shape, and/or location of the containment vessel 508, the structure and/or shape of the filament 510, or any combination thereof. In some embodiments, the perforated metal sheets 512 further restricts the spatial concentration of the emitted waves. In some embodiments, at least some of the filament assemblies 506 are adapted to emit unidirectional electromagnetic waves.

In some embodiments, the chamber 502 includes the cooking platform 516 (e.g., the cooking platform 110) in the chamber 502. In some embodiments, the cooking platform 516 includes or is part of at least one of the one or more perforated metal sheets 512. The computing device can be configured to drive the filament assemblies 506 to emit at a spectral power distribution including a peak emission wavelength corresponding to excitable wavelength for the cooking platform 516. By tuning to include the peak emission wavelength to the excitable wavelength of the cooking platform 516, the computing device can heat up the cooking platform 516 without directly heating the air or the food inside the chamber 502.

The cooking platform 516 can be made of glass, silicone, high temperature plastic, ceramic, a composite, or metal. The cooking platform 516 can include an optically transparent region, such as via glass or glass-like material, enabling visible light to substantially travel through two opposing surfaces of the cooking platform 516. For example, prior to heating, a user of the cooking instrument 500 can place an instruction sheet beneath the cooking platform 516 while arranging food on the cooking platform 516 to be cooked. The user can directly overlay specific food at the desired location according to the instruction sheet. In some embodiments, the cooking platform 516 includes a reflective portion 518 to enable a top side camera 522 to capture a bottom view of food resting on the cooking platform 516.

Figure 20:
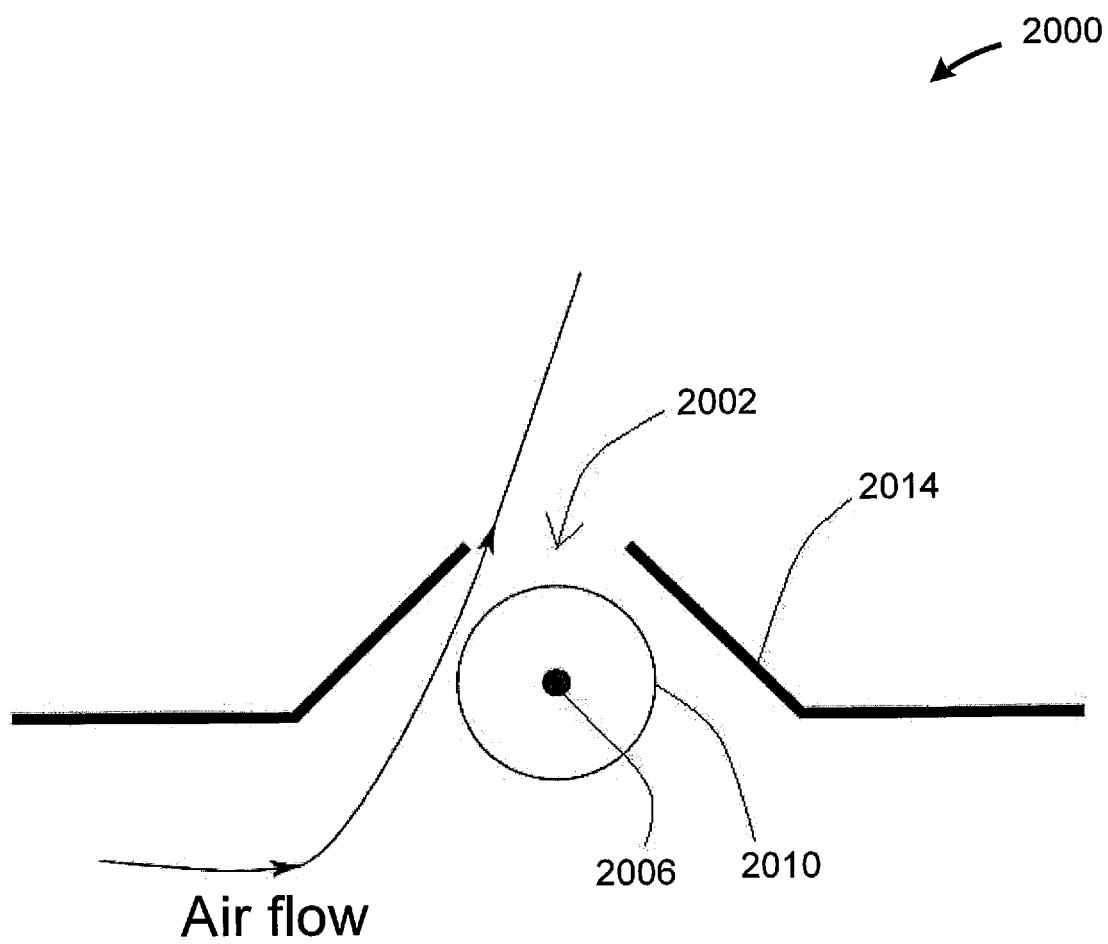
FIG. 20 is a cross-sectional diagram of a heating element with an air flow outlet, in accordance with various embodiments.

In some embodiments, the cooking instrument 500 includes an airflow-based cooling system (e.g., including a cooling unit 520A, a cooling unit 520B, a cooling unit 520C, a cooling unit 520D, a cooling unit 520E, and a cooling unit 520F, collectively as the "cooling system 520"). The airflow-based cooling system 520 can blow directly onto a reflector portion of the containment vessel 508 to cool (e.g., prevent vaporization of the reflective coating) and/or improve performance of the reflector 511. The airflow can be controlled to provide impingement convection heating. The airflow-based cooling system 520 can have an air path that filters steam and thus prevents hot air from escaping when the door of the cooking instrument 500 is opened. The air path can also be configured to go over a camera (not shown) of the cooking instrument 500 to keep the lens of the camera condensation free. In some embodiments, air flow and convection can be achieved through passive, chimney like effects, for example holes or gaps can be installed in reflectors such that air super-heated through bulb/filament containment vessel contact will experience a reduction in density and thus buoyantly flow through such gaps. FIG. 20 is a cross-sectional diagram of a heating element 2000 with an air flow outlet 2002, in accordance with various embodiments. The heating element 2000 can include a filament 2006 enclosed in a containment vessel 2010. The heating element 2000 can include a reflector 2014 disposed over the filament 2006 and the containment vessel 2010. The reflector 2014 can include the air flow outlet 2002 (e.g., a hole in the reflector 2014) acting as the "gap" described above.

In some embodiments, a fan can be installed away from the filament assemblies 506. When the spectral power distribution (including one or more peak wavelengths) of a filament assembly is configured to heat the envelope and/or the containment vessel 508, the fan can stir the air within the chamber 502 to ensure that heated air adjacent to the containment vessels 508 is moved to other parts of the chamber 502 to cook the food.

In some embodiments, the cooking instrument 500 lacks a crumb tray. Optionally, the cooking instrument 500 can use a heat resistant sheet 520 (e.g., quartz or other material) to cover the filament assemblies 506 so that the bottom of the cooking instrument chamber has no filament assemblies to trip over. The heat resistant sheet can be transparent at the operating wavelengths of the filament assemblies 506 to enable for the emission from the filament assemblies 506 to penetrate through without much loss.

In some embodiments, the computing device within the cooking instrument 500 can drive the filament assemblies 506 according to instructions in a cooking recipe. For example, the computing device can drive at least one of the filament assemblies 506 at a peak wavelength. The peak wavelength can correspond to excitable wavelengths of the materials in the cooking platform 516, the containment vessel 508 (e.g., envelope of the filament assembly), a specific type of edible material, water molecules, or any combination thereof. By matching a particular peak wavelength corresponding to an excitable wavelength of a target material, the computing device can target specific material for heating. For example, the computing device can drive at least one of the filament assemblies 506 at a peak wavelength (e.g., 3 µm or above for a glass cooking platform) such that the cooking platform 516 is substantially opaque to waves emitted from the at least one of the filament assemblies 506. The computing device can drive at least one of the filament assemblies 506 at a peak wavelength (e.g., 3 µm for less for glass cooking platforms) such that the cooking platform 516 is substantially transparent to waves emitted from the at least one of the filament assemblies 506. The computing device can drive at least one of the filament assemblies 506 at a peak wavelength (e.g., between 3 µm and 4 µm for glass cooking platforms) such that the cooking platform 516 is heated by waves emitted from the at least one of the filament assemblies 506 without substantially heating any organic food in the cooking chamber.

FIG. 5B is a cross-sectional top view of the cooking instrument 500 of FIG. 5A along lines A-A', in accordance with various embodiments. FIG. 5B can illustrate the perforated metal sheet 512A and cavities within the perforated metal sheet 512A that exposes the cooking platform 516. For example, the perforated metal sheet 512 includes a rectangular cavity 524A and an oval cavity 524B that exposes the cooking platform 516 underneath.

FIG. 5C is a cross-sectional top view of the cooking instrument 500 of FIG. 5A along lines B-B', in accordance with various embodiments. FIG. 5C can illustrate the cooking platform 516. In embodiments where the cooking platform 516 is transparent or semitransparent, the reflective portion 518 may be visible from the cross-sectional top view.

In some embodiments, the cooking platform 516 can be virtually divided into cooking target zones (e.g., zone 528A, zone 528B, zone 528C, and zone 528D, collectively as the "cooking target zones 528"). That is, food cooking recipes and heating sequences can reference these cooking target zones 528. Each of the cooking target zones 528 can be defined by physically visible perimeters (e.g., a zone A perimeter 530A, a zone B perimeter 530B, a zone C perimeter 530C, and a zone D perimeter 530D, collectively as the "visible perimeters 530"). The visible perimeters 530 can be of different sizes and shapes (e.g., overall or rectangular). In some embodiments, the visible perimeters 530 can be marked by heat resistant paint. In some embodiments, the visible perimeters 530 can be defined by structural channeled edges or beveled edges in the cooking platform 516. In some embodiments, each of the visible perimeters 530 can be defined by the corresponding cooking target zone being terraced (e.g., elevated or depressed). In some embodiments the cooking platform 516 can contain physically independent zones. These zones can be physically separated, connected by materials different from the cooking platform 516 itself, or by optical elements to change the local spectral power distribution in the zones.

In some embodiments, the cooking target zones 528 can include visible labels (e.g., a zone A label 534A, a zone B label 534B, a zone C label 534C, and a zone D label 534D, collectively as the "visible labels 534"). The visible labels 534 can advantageously provide a clear reference for a user to know where to place portions of food as instructed by the cooking instrument 500 (e.g., via displayed information related to instructions associated with a cooking recipe).

Figure 6:
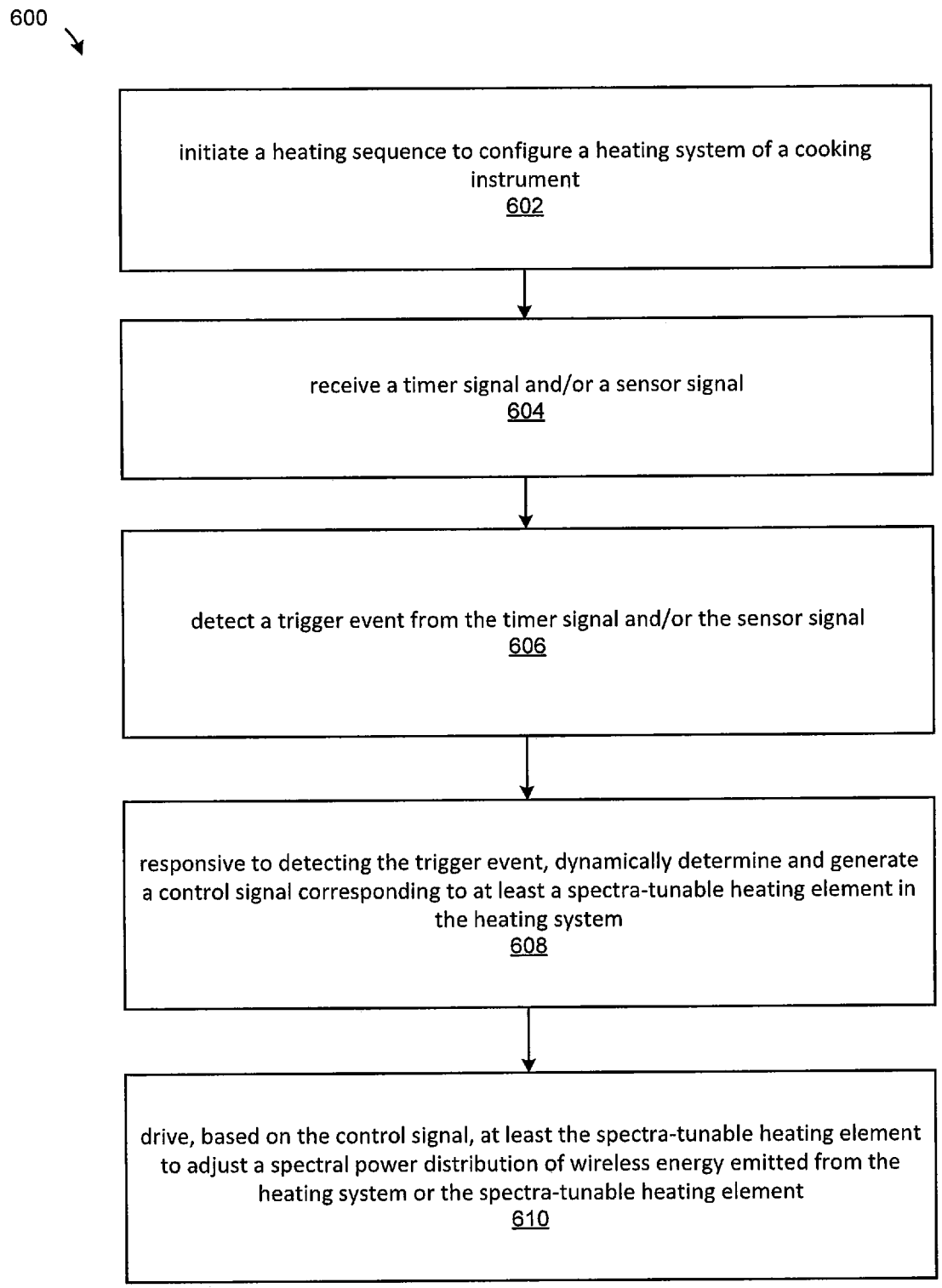
FIG. 6 is a flow chart illustrating a method of operating a cooking instrument, in accordance with various embodiments.

FIG. 6 is a flow chart illustrating a method 600 of operating a cooking instrument (e.g., the cooking instrument 100, the cooking instrument 200, and/or the cooking instrument 500), in accordance with various embodiments. The method 600 can be executed by a control system (e.g., the computing device 206) of the cooking instrument. At step 602, the control system can initiate a heating sequence to configure a heating system (e.g., the heating system 216) of the cooking instrument. For example, configuration of the heating system includes configuration of individual spectra-tunable heating elements. The heating sequence can include instructions to configure at least a spectra-tunable heating element of the heating system.

At step 604, the control system can then receive a timer signal and/or a sensor signal. The timer signal can be a continuous data stream of time indicators or discrete data packets (e.g., periodic or otherwise) indicative of time. The sensor signal can be a continuous data stream of sensor measurements or discrete sensor measurements (e.g., periodic or otherwise). The continuous data streams can be uninterrupted while the heating system is operating.

At step 606, the control system can detect a trigger event from the timer signal and/or the sensor signal. Responsive to detecting the trigger event, at step 608, the control system can dynamically determine and generate a control signal corresponding to at least the spectra-tunable heating element in the heating system. At step 610, the control system can drive, based on the control signal, at least the spectra-tunable heating element to adjust a spectral power distribution of wireless energy emitted from the heating system or the spectra-tunable heating element. Driving the heating system can include adjusting the spectral power distribution of the wireless energy by selectively turning off or selectively reducing intensity of power supplied to the at least one heating element in the heating system.

In some embodiments, the heating system adjusts the spectral power distribution while preserving the total output power of the heating system, such as by increasing an output intensity for a first wavelength spectrum while reducing an output intensity for a second wavelength spectrum. In some embodiments, the heating system adjusts the spectral power distribution without preserving the total output power. The first wavelength spectrum can be longer or shorter than the second wavelength spectrum. In the case that the first wavelength spectrum is longer, the heating system or the spectra-tunable heating element essentially targets direct heat transfer to a material with an absorption band that is longer in wavelength. In the case that the first wavelength spectrum is shorter, the heating system or the spectra tunable heating element essentially targets direct heat transfer with an absorption band that is shorter in wavelength.

In some embodiments, adjusting the spectral power distribution includes adjusting spectral power distribution of wireless energy emitted from only a subset of heating elements in the heating system. Here, "only a subset" means less than all of the heating elements in the heating system.

While processes or methods are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Figure 7:
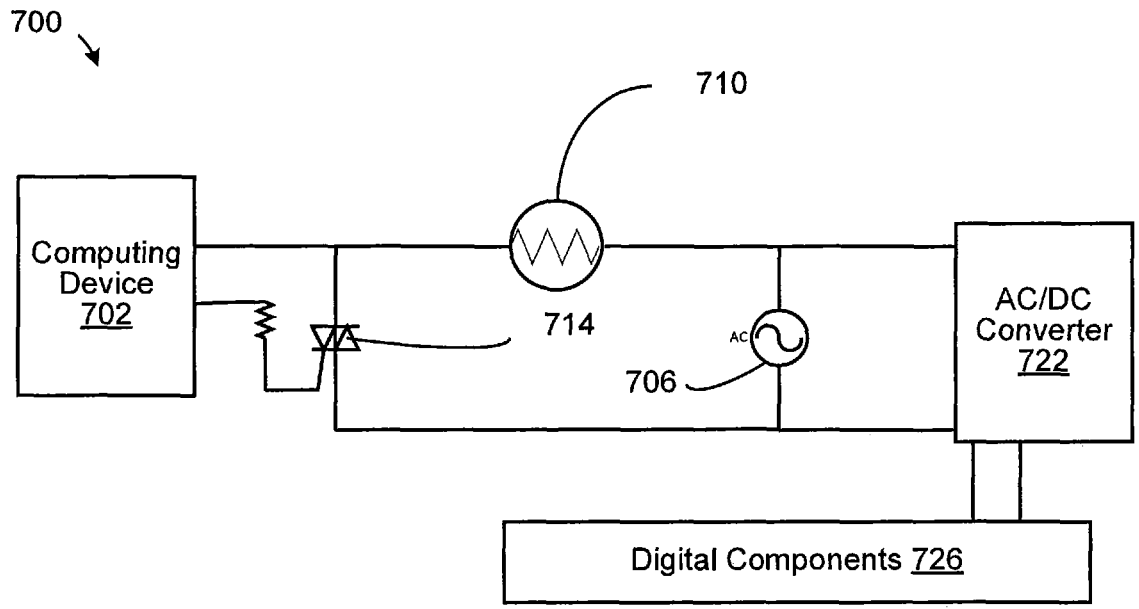
FIG. 7 is a simplified circuit diagram illustrating electrical connections of a power supply of a cooking instrument, in accordance with various embodiments.

FIG. 7 is a simplified circuit diagram illustrating electrical connections of a power supply 700 (e.g., the power supply 202) of a cooking instrument (e.g., the cooking instrument 200), in accordance with various embodiments. The power supply 700 can be controlled by a computing device 702 (e.g., an analog control circuitry, application-specific integrated circuit (ASIC), a general-purpose processor/controller configurable by firmware or software, or any combination thereof). The power supply 700 can draw power from an AC power source 706.

The power supply 700 can include electric component(s) for driving at least a heating element 710 of a heating system (the heating system 216) of the cooking instrument. For example, a switchable relay 714 can be electrically coupled to the heating element 710. The switchable relay 714 can be electrically coupled to the computing device 702 such that the computing device 702 can control (e.g., via a control signal) whether power is supplied from the AC power source 706 to the heating element 710. In some embodiments, the computing device 702 can also control how (e.g., pulse modulation) and how much power is provided to the heating element 710. In some embodiments, the switchable relay 714 can provide half waves of the AC power to the heating element 710. In some embodiments, the switchable relay 714 includes a TRIAC. In some embodiments, the power supply 700 includes multiple instances of the switchable relay 714 respectively corresponding to multiple instances of the heating element 710.

The power supply 700 can include electric elements for supplying the DC power to digital components of the cooking instrument, including for example, the computing device 702. For example, the power supply 700 includes an AC/DC converter 722 electrically coupled between the AC power source 706 and digital components 726 of the cooking instrument. In some embodiments, the digital components 726 includes the computing device 702.

FIG. 8 is a graph illustrating a temperature trace 800 of a heating element over time using an unmodulated method of driving the heating element. In the illustrated example, at an initial time t0 802, the power to the heating element is turned on (e.g., from no power to a constant supply of DC power or rectified AC power). At the initial time 802, the temperature of the heating element is substantially the same as the temperature in a cooking chamber (chamber temperature) that the heating element is in. After the initial time 802, there is a ramp-up period 806. During the ramp-up period 806, the temperature of the heating element increases drastically prior to reaching a point of equilibrium 810. At the point of equilibrium 810, the rate of temperature dissipation of the heating element becomes substantially equal to the rate of temperature increase due to the electrical driving power. After the power turns off at termination time tf, 814, the temperature of the heating element decreases (e.g., approximately an exponential decay) until it reaches the chamber temperature.

The total heater-on time 816 starts from the initial time 806 to the termination time 814. Because a substantially constant temperature is only maintained from the point of equilibrium 810 to the termination time 814 and because the emission spectral power distribution of the heating element depends on the temperature, a substantially constant cooking characteristic is maintained from the point of equilibrium 810 to the termination time 814. This unmodulated method of driving the heating element can only maintain a single cooking characteristic by relying on the heat dissipation equilibrium.

Figure 9:
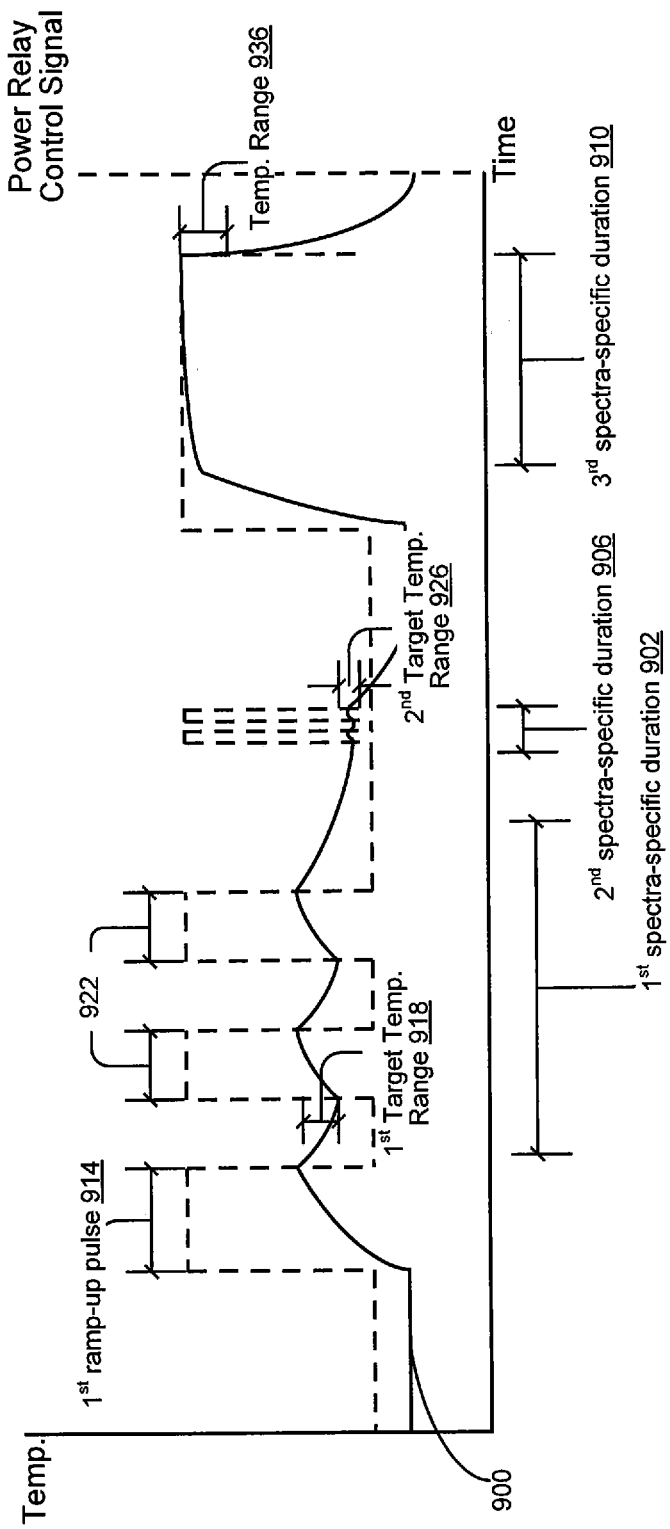
FIG. 9 is a graph illustrating a temperature trace of a heating element over time using a pulse modulation method of driving the heating element, in accordance with various embodiments.

FIG. 9 is a graph illustrating a temperature trace 900 of a heating element over time using a pulse modulation method of driving the heating element, in accordance with various embodiments. While the temperature trace 900 illustrates just a first spectra-specific duration 902, a second spectra-specific duration 906, and a third spectra-specific duration 910, the pulse modulation method of the various embodiments can support more than three emission spectral power distribution configurations for the heating element.

In the illustrated example, in the first spectra-specific duration 902, the heating element can be driven by a series of electrical pulses. During a first ramp-up time 914, the temperature trace 900 of the heating element rises until it reaches the maximum amount in a first target temperature range 918. The temperature trace 900 then decays until a series of electrical pulses 922 starts to drive the heating element. The temperature of the heating element then rises (during each of the electrical pulses 922) and falls (between each of the electrical pulses 922) within the first target temperature range 918. As described above, because the spectral power distribution of waves emitted from the heating element corresponds to the temperature of the heating element and because the temperature of the heating element is maintained within the first target temperature range 918, the electrical pulses 922 substantially maintain the spectral power distribution of the waves emitted from the heating element within a tolerable variance corresponding to the first target temperature range 918. In some embodiments, each electrical pulse comprises one or more rectified half waves of AC power cycles. In some embodiments, each electrical pulse can be a DC pulse (e.g., square waves).

Utilizing different pulse modulation configurations (e.g., different pulse width/duty cycle and different pulse frequency), the temperature can be kept at a second target temperature range 926 in the second spectra-specific duration 906. The pulse modulation method can also still utilize the temperature dissipation equilibrium similar to the graph in FIG. 8. In the third spectra-specific duration 910, the heating element can be driven by a wide pulse of rectified power signal to maintain the temperature within a third target temperature range 936. For example, the wide pulse can be the pulse modulation at a higher wavelength than the pulse modulation during the first spectra specific duration 902.

Power Manipulation

An important flavor-producing reaction in cooking is the Maillard reaction. The Maillard reaction creates brown pigments in cooked meat in a very specific way: by rearranging amino acids and certain simple sugars, which then arrange themselves in rings and collections of rings that reflect light in such a way as to give the meat a brown color. The Maillard reaction is not simply a change in color, it is both a change in flavor and aroma. The molecules such reaction produces provide the potent aromas responsible for the characteristic smells of roasting, baking, and frying. This reaction has a chain effect: what begins as a simple reaction between amino acids and sugars quickly becomes complicated: the molecules produced keep reacting in ever more complex ways that generate many more molecules. Most of these new molecules are produced in incredibly minute quantities, but that does not mean they do not impact aroma or flavor.

The Maillard reaction occurs in cooking of almost all kinds of foods, although the simple sugars and amino acids present produce distinctly different aromas. The Maillard reaction, or its absence, distinguishes the flavors of boiled, poached, or steamed foods from the flavors of the same foods that have been grilled, roasted, or otherwise cooked at temperatures high enough to dehydrate the surface rapidly—in other words, at temperatures above the boiling point of water. These two factors, dryness and temperature, are some of the controls for the rate of the Maillard reaction. Several embodiments enable the control system to achieve this Maillard reaction.

High power density cooking and thus high-temperature cooking speeds up the Maillard reaction because heat both increases the rate of chemical reactions and accelerates the evaporation of water. As the food dries, the concentration of reactant compounds increases and the temperature climbs more rapidly. Higher temperatures tend to bring about the Maillard reaction, but as long as the food is very wet, its temperature cannot climb above the boiling point of water. At atmospheric pressure, only high-heat cooking techniques can dry out the food surface enough to raise the temperature sufficiently.

One of the challenges to getting the Maillard reaction going is getting the surface hot and dry enough without overcooking the underlying flesh, or at least overcooking it as little as possible. Raising the temperature even higher does not always enhance the Maillard reaction, as at a certain point, pyrolysis sets in. People typically like foods a little charred, but with too much pyrolysis comes bitterness. When trying to induce the Maillard reaction while cooking with light a positive feedback loop can be created, e.g. as food browns, light absorption rates increase which speed up browning. Feedback mechanism to the control system are thus helpful in modulating power to maximize Maillard products while avoiding an undesired amount of charring.

In addition to the Maillard reaction other beneficially quantifiable cooking results include breakdown of cellulose, caramelization, the rendering of fat, modifying protein structure, or any combination thereof. These changes/results can be detected via sensor signal analysis (e.g., image analysis, auditory analysis, particulate analysis, or any combination thereof) or inferred by timing. Several embodiments include a cooking instrument that is capable of precisely controlling food quality by sensing physical parameters, and being able to do achieve such food quality quickly. The features described herein enables a cooking instrument to achieve quantifiable cooking result with precision and speed.

Several embodiments include a cooking instrument capable of increasing its power density. For example, in a first mode, the cooking instrument can apply a power density higher than that from a different mode while consuming substantially equivalent power from an external power source. The cooking instrument can include a power supply (e.g., the power supply 202), a heating system (e.g., the heating system 216), a cooking chamber (the cooking chamber 102), a computer readable memory (the operational memory 210 or the persistent memory 214), and a control system (the computing device 206). The power supply can be electrically coupled to an external variable power source having an upper power draw limit. The heating system can be electrically coupled to the power supply to generate electromagnetic power. The cooking chamber can be adapted to store food at least when the heating system is operational and drawing power from the power supply. The computer readable memory can store a mapping function specifying parameters associated with driving the heating system to achieve one or more quantifiable cooking result. The control system can be configured to select a quantifiable cooking result and control, based on the mapping function, power provided to the heating system to achieve the quantifiable cooking result. For example, the control system can increase power density applied to the food while consuming substantially equivalent power from the external power source as compared to another mode of operation of the heating system. The control system can increase the power density by selecting a power transfer pathway that transfers more of the power provided from the heating system to the food compared to another power transfer pathway (e.g., a power transfer pathway that concentrates electromagnetic emission or combines multiple sources of electromagnetic emission). The control system can increase the power density by managing (e.g., increasing or decreasing in a controlled manner) temperature of one or more heating elements in the heating system. The control system can increase the power density by mechanically moving at least a portion of the heating system toward the food. The control system can increase the power density by mechanically moving at least a portion of the food toward at least one of the heating elements. In some embodiments, the control system can select the power transfer pathway by selecting and driving a heating element with an emission surface area larger than another heating element in the heating system.

For example, the quantifiable cooking result can include a measurable temperature or spatial temperature distribution by a temperature sensor (e.g., the chamber thermometer 250, the temperature probe 254, the cooking platform temperature sensor 264, sensor reading from the accessory sensor interface 266, or any combination thereof), a sear level (e.g., one or more color characteristics of a target food image where such color characteristics are indicative of how seared the target food is) as identified in an image or other sensor signals provided to the control system, a rate of change of temperature over time to at least a portion of the food (e.g., as measured by a temperature probe), a moisture content as identified by a moisture sensor provided to the control system, or any combination thereof.

In some embodiments, the control system can select the power transfer pathway by selecting and driving a heating element in the heating system that is aligned with one or more optical elements. The optical elements can change the electromagnetic emission from a filament assembly in the heating element, such as changing intensity, direction, spectral distribution, or any combination thereof. In some cases, an optical element aligned with a filament assembly (e.g., filament and its containment vessel) can be considered part of a single heating element. For example, FIG. 10A is a cross-sectional diagram that illustrates a filament assembly 1002A aligned with a light pipe 1012, in accordance with various embodiments. In this example, a reflector 1006A directs stray electromagnetic emissions from the filament assembly 1002A back toward the light pipe 1012, which in turn directs the electromagnetic emission toward the intended location of food on a cooking platform 1010A. In another example, FIG. 10B is a cross-sectional diagram that illustrates a filament assembly 1002B aligned with a diffractive element 1014, in accordance with various embodiments. In this example, a reflector 1006B directs stray electromagnetic emission from the filament assembly 1002B back toward the diffractive element 1014, which in turns focuses (e.g., concentrates to a smaller area or a single point) the electromagnetic emission toward the intended location of food on a cooking platform 1010B. FIG. 10C is a cross-sectional diagram that illustrates a filament assembly 1002C aligned with a focusing device 1016, in accordance with various embodiments. In this example, a reflector 1006C directs stray electromagnetic emission from the filament assembly 1002C back toward the focusing device 1016C, which in turns focuses the electromagnetic emission toward the intended location of food on a cooking platform 1010C. FIG. 10D is a cross-sectional diagram that illustrates a filament assembly 1002D aligned with a reflector 1006D, in accordance with various embodiments. The example in FIG. 10D is a simplified system that utilizes a reflector that not only recaptures stray electromagnetic emission back toward the intended location of food on a cooking platform 1010D, but also focuses such electromagnetic emission to increase its power intensity, change power uniformity, limit the area exposed to direct or reflected power, or any combination thereof. Reflectors can also be used to redirect power to the filament to increase temperature without the need for additional applied power from the source. Reflectors can be designed to take advantage of multiple reflections (e.g., including constructive at locations needing higher power intensity and/or destructive interference at locations needing lower power intensity). In some embodiments, the optical elements can change shape or focusing properties dynamically either passively or under the direction of the control system.

Figure 11:
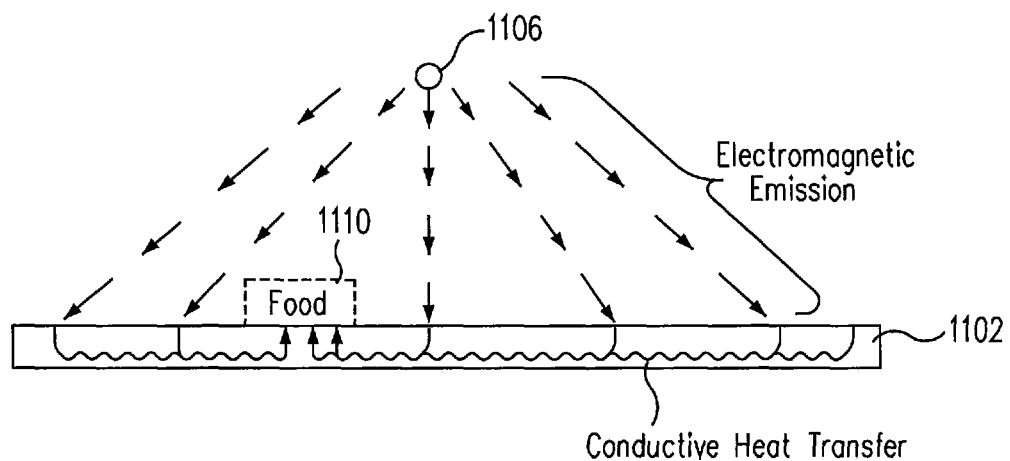
FIG. 11 is a heat flow diagram illustrating an example of how a cooking platform is able to capture more power from a heating element and then redirect it to a smaller area that is in contact with a food target, in accordance with various embodiments.

In some embodiments, the cooking instrument includes a cooking platform or container. The control system in these embodiments can select the power transfer pathway by selecting and driving a heating element to generate electromagnetic emission that can directly or indirectly heat the cooking platform. In these embodiments, the control system can configure such electromagnetic emission to be absorbable by the cooking platform (e.g., by matching one or more emission spectra peaks within an absorption band of the cooking platform). The cooking platform can be adapted to absorb the electromagnetic emission from the heating element as heat and conductively transfer such heat to the food. FIG. 11 is a heat flow diagram illustrating an example of how a cooking platform 1102 is able to capture more power from a heating element 1106 (e.g., utilizing the larger surface area of the cooking platform exposed to the heating system) and then redirect it to a smaller area that is in contact with a food target 1110, in accordance with various embodiments. In some applications, the amount of power absorbable by a small amount of food on the cooking platform is less than the amount of power absorbable by the cooking platform (e.g., because the cooking platform has a larger surface area at approximately the same distance from the heating element 1106). In these applications, if a substantial amount of the absorbed power from the cooking platform is subsequently transfer conductively to the food in contact therewith, then directly heating the cooking platform would achieve a higher power density in cooking the food than directly heating the food (e.g., assuming most of the absorbed power is thermally transferred via the area of contact between the cooking platform and the food). In some embodiments, the cooking platform includes one or more non-thermally conductive barriers such that the conductive thermal transfer is limited to occur within one or more zones on the cooking platform (e.g., see FIG. 19B as an example). The cooking platform can include sensors (e.g., the chamber thermometer 250, the temperature probe 254, the cooking platform temperature sensor 264, temperature readings from the accessory sensor interface 266, or any combination thereof) providing for example temperature feedback to the control system.

Figure 12:
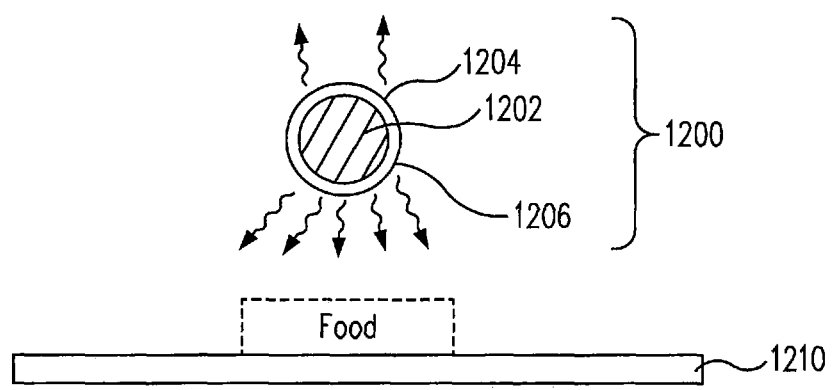
FIG. 12 is a cross-sectional diagram of a heating element with directional filament coating, in accordance with various embodiments.

In some embodiments, the control system can select the power transfer pathway by selecting and driving a heating element in the heating system, where the heating element includes a filament with different filament coatings in different directions (e.g., aluminum vs. tungsten) to promote higher efficiency of electromagnetic power generation in a particular direction. In some embodiments, different filament coatings include one direction having a filament coating and another direction not having a filament coating. In some embodiments, the filament can be composed of two different materials (e.g., each facing a different direction), with one material having higher efficiency at converting heat into electromagnetic power. FIG. 12 is a cross-sectional diagram of a heating element 1200 with directional filament coating, in accordance with various embodiments. For example, the heating element 1200 can include a filament 1202. On a first side facing away from a cooking platform 1210, the filament 1202 can be coated with a first filament coating 1204. On a second side facing the cooking platform 1210, the filament 1202 can be coated with a second filament coating 1206.

In some embodiments, the control system can select the power transfer pathway by selecting and driving a heating element with an emission surface area that passively grows over time. In these embodiments, the control system is configured to achieve the quantifiable cooking result according to the mapping function by utilizing passively increasing power density due to the passively growing emission surface area of a filament within the heating element. For example, various types of filaments have the characteristic of increasing their emission surface areas as their operating temperatures increase. Because the longer power is applied to a filament the higher its operating temperature gets, the control system can predict an increase in power density (as a function of emission surface area) based on a known mapping function between power applied and emission surface area or based on both a known mapping function between power applied and temperature and a known mapping function between temperature and emission surface area.

In some embodiments, the control system can configure the area of direct or indirect exposure of the electromagnetic admission to the target food by selecting a power transfer path that includes an electromagnetic wave focusing device, such as an optical element (e.g., reflectors, lenses, diffractive elements, or light pipes).

Figure 13:
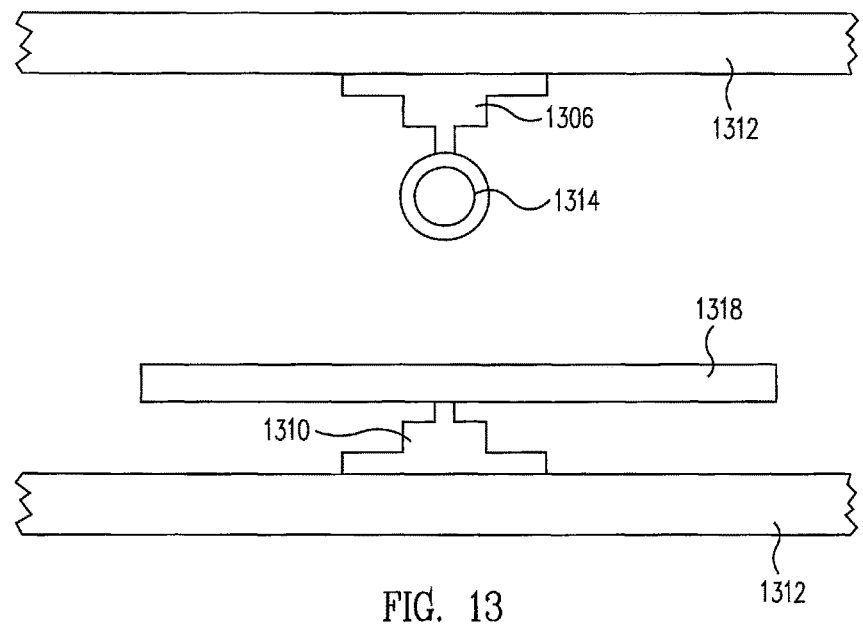
FIG. 13 is a cross-sectional diagram of a cooking instrument with a mechanical movement assembly for limiting the area of exposure of a heating system, in accordance with various embodiments.

In some embodiments, the control system can limit the area of direct or indirect exposure or increase the intensity of the electromagnetic emission by limiting a portion of the food exposed to electromagnetic emission generated by the heating system. One way to limit exposure is by physically decreasing the distance between the heating system and the intended food target. FIG. 13 is a cross-sectional diagram of a cooking instrument 1300 with a mechanical movement assembly for limiting the area of exposure of a heating system, in accordance with various embodiments. The movement assembly can include a heater movement mechanism 1306, a platform movement mechanism 1310, or both. In some embodiments, either or both of the heater movement mechanism 1306 and/or the platform movement mechanism 1310 is mechanically attached to a cooking chamber 1312. The heater movement mechanism 1306 can be mechanically coupled to at least one heating element 1314 of the heating system. The platform movement mechanism 1310 can be mechanically coupled to a cooking platform 1318. For example, the heater movement mechanism 1306 and/or the platform movement mechanism 1310 can be a sliding mechanism, a pulley system, a telescoping arm, a movement belt, a pneumatic arm, or any combination thereof. The heater movement mechanism 1306 can move the heating element toward a target food and back. The platform movement mechanism 1310 can move the target food toward the heating element 1314 and back.

In some embodiments, the control system can operate the cooking instrument in a searing mode (e.g., utilizing higher power density electromagnetic emission to cause Maillard reaction in at least a target portion of the food in the cooking chamber). For example, one or more heating elements of the heating system can be configured by the control system to utilize temporal bursts of electromagnetic power that are localized. In several embodiments, "bursts" refers to temporal modulation of electromagnetic power. The bursts can be directed (e.g., using different directional heating element or redirecting electromagnetic emission using the same one or more heating elements) to the same target region or spatially different regions of the food. Consecutive bursts can be spaced apart with durations of no power or reduced power at a power lower than that of the preceding and/or following burst. In some embodiments, the control system can utilize the periods of reduced power to heat one or more portions of the food (e.g., portions that need not go through the Maillard reaction to achieve the quantifiable cooking result). In some embodiments, the control system can utilize a different set of one or more heating elements (e.g., other than the heating elements used to create the bursts of electromagnetic power) during periods of the reduced power or no power to heat the region of the food targeted by the bursts from a different direction. This use of the different set of heating elements can sometimes speed up the Maillard reactions. Bursts may involve discontinuously changing applied power or may involve smoothly varying power through a range of levels. In some embodiments, the control system is configured to determine a bursting parameter for the bursts or the necessity of bursts based on a measurement from a sensor (e.g., the camera 222, the input component 234, the chamber thermometer 250, the temperature probe 254, the environment sensors 246, and/or the microphone 244 of FIG. 2). The measurement can be taken while the heating system is operational in the searing mode (e.g., hence used as a dynamic and substantially real-time feedback) or before the heating system is operational in the searing mode (e.g., indicative of an initial condition of the food). For example, the sensor can be adapted to take an image, an audio recording, a temperature measurement, a moisture reading, a particulate concentration reading, or any combination thereof. Such sensor measurement while the heating system is operational can serve as dynamic feedback of the food condition in substantially real-time. Such dynamic feedback can be a direct measurement via a sensor, or an attribute that the control system infers based on other known measurements. Configurable parameters can include power intensity or pattern of the bursts, burst duration, pause duration (e.g., burst separation) between bursts, power density intensity, emission temporal, spatial, or spectral distribution of the bursts or between the bursts, selection of one or more heating elements associated one or more of the bursts, directionality of one or more of the bursts, or any combination thereof. The control system is configured to achieve a uniform cooking result while driving the heating system with the increased power density by sequentially powering one or more heating elements of the heating system to spatially cover the same or adjacent regions of the food. The control system can also achieve uniform cooking result by simultaneously powering sets of different heating elements to combine and focus/concentrate their emissions to achieve a higher power density at corresponding sets of target regions on the food to achieve uniform cooking result.

In some embodiments, the cooking instrument can achieve uniform cooking in a target region of the food specified, indicated, or implied in the selected quantifiable cooking result despite using localized high power density. In one example, the control system can be configured to control its power supply to apply power utilizing at least two heating elements simultaneously or in rapid succession from different directions to heat the food. In one example, the control system can be configured to utilize optical elements to changes direction of energy flow such that the spatial distribution of the applied electromagnetic emission is uniform. Several embodiments include a cooking instrument that has a power supply (e.g., the power supply 202 of FIG. 2) electrically coupled to an external variable power source having an upper power draw limit. The cooking instrument can have a cooking chamber. A control system (e.g., the computing device 206 of FIG. 2) of the cooking instrument can determine a placement location of food inside its cooking chamber (hereafter referred to as "food location"). The cooking instrument can have a heating system (e.g., the heating system 216 of FIG. 2), electrically coupled to the power supply, comprising one or more heating elements. For example, the heating system can include a first heating element that has a first electromagnetic emissivity in a first direction and a second electromagnetic emissivity in a second direction, where the first direction is toward the food location and that the first electromagnetic emissivity is higher than the second electromagnetic emissivity. In some embodiments, optical elements (e.g., passive optics or dynamic optics) aligned with the filament(s) in a heating element can be considered part of the heating element. The cooking instrument can include a computer readable memory (e.g., the operational memory 210 or the persistent memory 214 of FIG. 2) storing a mapping function specifying parameters associated with driving the heating system to achieve a quantifiable cooking result. The control system can be configured to control power provided to the heating system. The control system can be configured to select a quantifiable cooking result corresponding to higher heat transfer to surface of the food compared to heat transfer to center of the food. The control system can be configured to, in response to selecting the quantifiable cooking result, drive the heating system to achieve the quantifiable cooking result according to the mapping function. For example, the control system can drive the heating system by powering the first heating element without powering all of the multiple heating elements.

Figure 14:
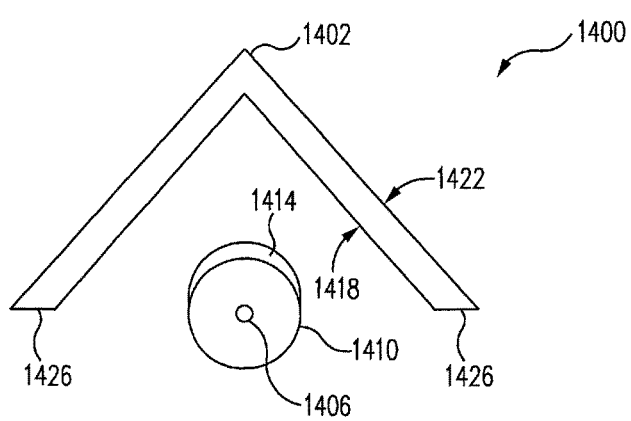
FIG. 14 is a cross-sectional diagram of an example of a heating element having a double-layered reflector aligned with a heating element, in accordance with various embodiments.

In several embodiments, the first heating element has an electromagnetic emitter (e.g., the filament assembly 228A of FIG. 2) and a reflector (e.g., the reflector 511 of FIG. 5). In some embodiments, the reflector is a structure with at least two layers with reduced heat conducting volumes between the layers to redirect electromagnetic energy generated by the electromagnetic emitter. FIG. 14 is a cross-sectional diagram of an example of a heating element 1400 having a double-layered reflector 1402 aligned with a heating element 1406, in accordance with various embodiments. The heating element 1406 can include a filament 1406 at least partially enclosed in a containment vessel 1410, the containment vessel 1410 optionally with a reflective coating 1414. The double-layered reflector 1402 can include a first layer wall 1418 separated by vacuum or air from a second layer wall 1422. In some embodiments, sides 1426 of the double-layered reflector 1402 can comprise a different material than the first layer wall 1418 and the second layer wall 1422.

Figure 15:
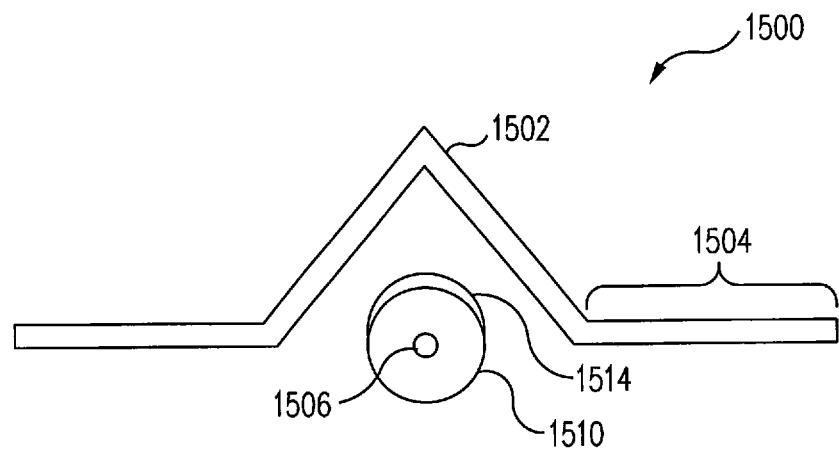
FIG. 15 is a cross-sectional diagram that illustrates an example of a heating element with a re-radiator, in accordance with various embodiments.

In some embodiments, a reflector is thermally coupled to a re-radiator to re-emit at least a portion of electromagnetic energy that is absorbed instead of reflected by the reflector. FIG. 15 is a cross-sectional diagram that illustrates an example of a heating element 1500 with a re-radiator 1504, in accordance with various embodiments. In this example, the heating element 1500 includes a reflector 1502 similar to the reflector 1402 of FIG. 14. However, the reflector 1502 is integral with the re-radiator 1504. Similar to the heating element 1400, the heating element 1500 can include a filament 1506 at least partially enclosed in a containment vessel 1510, the containment vessel 1510 optionally coated with a reflective coating 1514.

Figure 16A:
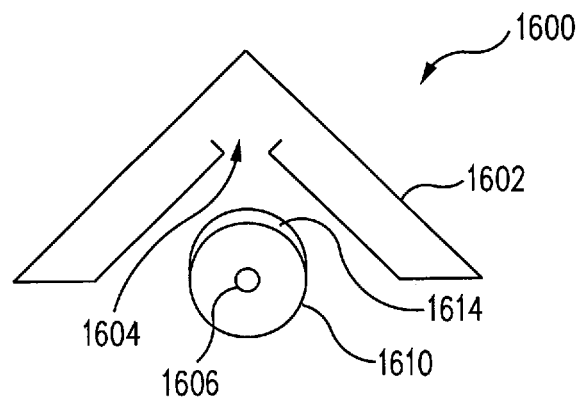
FIG. 16A is a cross-sectional diagram of an example of a heating element with a reflector having an air conduit structure to direct convection current of heated air to the food, in accordance with various embodiments.
Figure 16B:
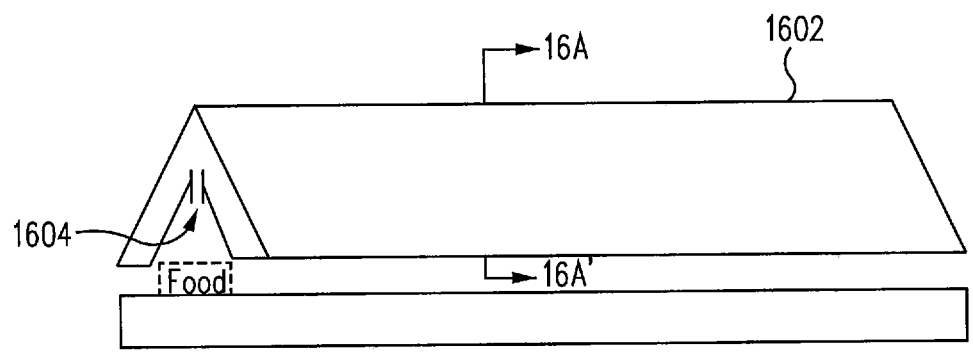
FIG. 16B is a side perspective view of the reflector above a cooking platform.

In some embodiments, a reflector can include an air conduit structure to direct convection current of heated air to the food. In some embodiments this directed air can be used to promote cooking in food regions that receive less direct electromagnetic energy. FIG. 16A is a cross-sectional diagram (along cross-sectional plane 16A shown in FIG. 16B) of an example of a heating element 1600 with a reflector 1602 having an air conduit structure 1614 to direct convection current of heated air to the food, in accordance with various embodiments. The reflector 1602 can be aligned with a filament 1606 at least partially enclosed in a containment vessel 1610, the containment vessel optionally having a reflective coating 1614. The air conduit structure 1614 can be a cylindrical structure within the reflector 1602 with an opening above the filament 1606. FIG. 16B is a side perspective view of the reflector 1602 above a cooking platform 1620. Food can be placed on the cooking platform 1620. For example, the air conduit structure 1614 can have a second opening toward the end of the reflector 1602 that faces downward toward an expected location of the food on the cooking platform 1620. That way, heated air from the first opening above the filament 1606 can travel within the air conduit structure 1614 of the reflector 1602 all the way to the second opening and heat the food.

Figure 17A:
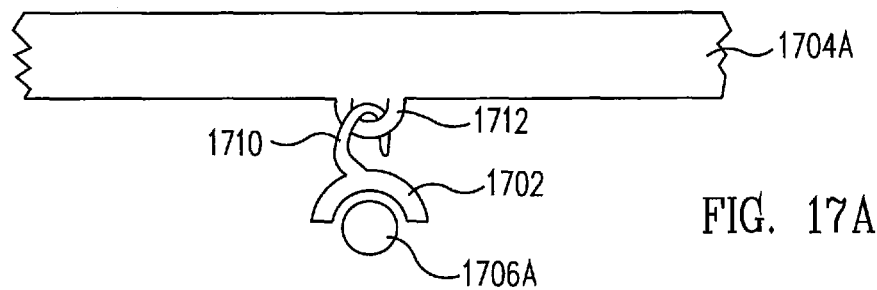
FIG. 17A is a side view of an example of a reflector secured to a cooking chamber via a ring-and-hook structure, in accordance with various embodiments.
Figure 17B:
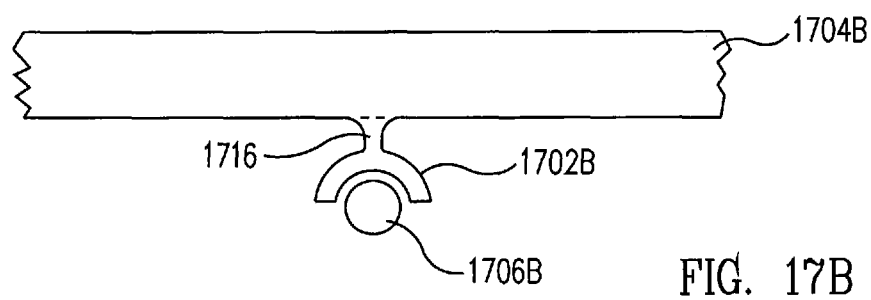
FIG. 17B is a cross-sectional view of an example of a reflector secured to a cooking chamber, in accordance with various embodiments.
Figure 17C:
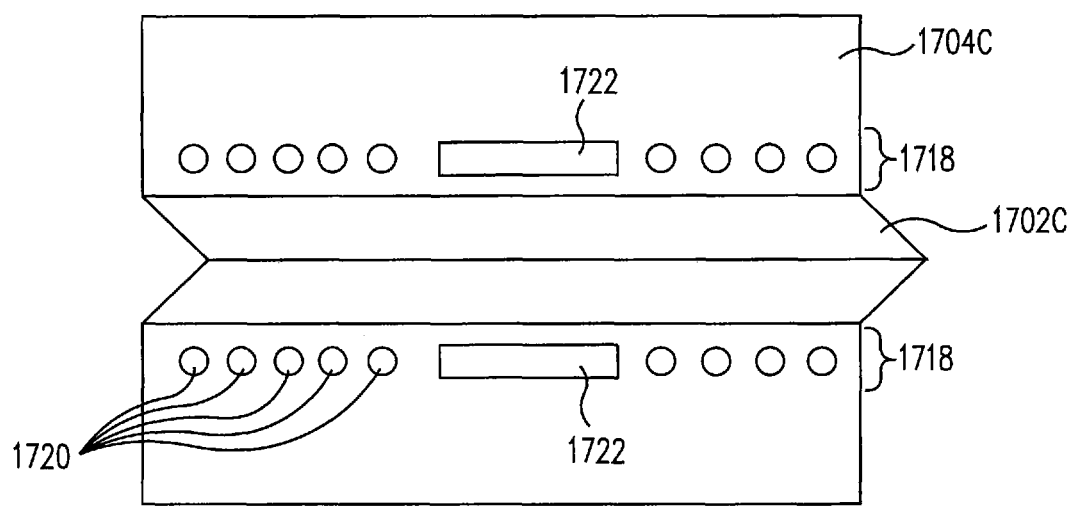
FIG. 17C is a bottom perspective view of a reflector that is built into a cooking chamber, in accordance with various embodiments.

In some embodiments, a reflector is attached to a cooking chamber (e.g., the cooking chamber 102 of FIG. 1) via a neck region such that the neck region is narrower than the reflector and a portion of the cooking chamber attached to the neck region. For example, the neck region can include a single bridge with one or both narrowing ends, a collection of multiple bridges, or a single bridge with multiple holes therethrough. FIG. 17A is a side view of an example of a reflector 1702A secured to a cooking chamber 1704A via a ring-and-hook structure, in accordance with various embodiments. The reflector 1702A can be aligned with and/or part of a heating element 1706A. The heating element 1706A can be attached to the cooking chamber 1704A or the reflector 1702A via a connection not shown in FIG. 17A. The reflector 1702A can include a hook region 1710 and the cooking chamber 1704A can include a ring region 1712. In other embodiments (not shown), the reflector 1702A can have a ring region instead and the cooking chamber 1704A can include a hook region instead. In these embodiments, the hook region 1710 and the ring region 1712 together can be considered the "neck region" as discussed above. FIG. 17B is a cross-sectional view of an example of a reflector 1702B secured to a cooking chamber 1704B, in accordance with various embodiments. The reflector 1702B is integral with the cooking chamber 1704B with a bridge region 1716 that narrows in its cross-sectional area (e.g., perpendicular to the direction it extends) as it extends from the cooking chamber 1704B toward the reflector 1702B. The bridge region 1716 can be considered the "neck region" as discussed above. The reflector 1702B can be aligned with and/or part of a heating element 1706B. The heating element 1706B can be attached to the cooking chamber 1704B or the reflector 1702B via a connection not shown in FIG. 17B. FIG. 17C is a bottom perspective view of a reflector 1702C that is built into a cooking chamber 1704C, in accordance with various embodiments. To minimize conductive contact, an interface region 1718 between the reflector 1702C and the rest of the cooking chamber 1704C includes one or more holes 1720 and/or one or more slits 1722. The interface region 1718 can be considered the "neck region" as discussed above.

In some embodiments, the reflector has a reflectivity that is higher than an area on an opposite side of the heating element from the food and higher than any material in between the heating element and the food. In some embodiments, the reflector has a reflectivity that is higher than an area adjacent and proximate to the heating element. FIG. 18 is a cross-sectional diagram of a cooking instrument 1800 where a reflector 1802 is integral with a cooking chamber 1806, in accordance with various embodiments. In these embodiments, even though the reflector 1802 is integral with the cooking chamber 1806, the reflectivity of the reflector 1802 is nevertheless different (e.g., higher) than the reflectivity of a bottom chamber wall 1810 of the cooking chamber 1806 (e.g., located on the opposite side of the cooking chamber 1806 from the reflector 1802). The reflectivity of the reflector 1802 is also higher than a cooking platform 1812 for holding the target food of the cooking instrument 1800. The reflectivity of the reflector 1802 can further be higher than a filament assembly 1816 (e.g., including filament and containment vessel). The reflectivity of the reflector 1802 is further higher than the chamber walls immediately adjacent to the reflector 1802. In various embodiments, the material of the reflector 1802 is different from the material of the cooking platform 1812 and/or the rest of the cooking chamber 1806.

In several embodiments, the cooking instrument has a cooking platform (e.g., the cooking platform 110 of FIG. 1) with an exposed surface in contact with food. The first heating element can have a reflector (e.g., the reflector 511 of FIG. 5) with a thermally conductive structure such that energy absorbed by the reflector when the heating system is operational is conductively transferred to the cooking surface. FIG. 19A is a cross-sectional view of a cooking instrument 1900 having a reflector 1902 for a filament assembly 1906 that has a thermal conductive structure 1910 to facilitate heat transfer to a surface of a cooking platform 1914, in accordance with various embodiments. The cooking platform 1914 is adapted to hold food while the filament assembly 1906 is operational. FIG. 19B is a top view of the cooking platform 1914 of FIG. 19A. The cooking platform 1914 can be divided into zones 1920A-C. The zones 1920A-C can be separated by thermally insulating barriers 1924A-B. In this example, the thermal conductive structure 1910 is adapted to transfer heat from the reflector 1902 to the zone 1920B. The thermally insulating barriers 1924A-B can prevent the transferred heat from leaking to the zone 1920A or the zone 1920B.

In several embodiments, the cooking instrument has multiple heating elements (e.g., the heating elements 114 of FIG. 1) with heterogeneous reaction times. At least one heating element has a faster reaction time, compared to another heating element. Reaction time determines how quickly the control system can drive the electromagnetic emission of the heating system to some equilibrium.

Several embodiments include a cooking instrument with a control system configured to control power provided to the heating system, select a quantifiable cooking result and drive the heating system to achieve the quantifiable cooking result. In these embodiments, the control system, when operating in at least one mode of operation, configures the heating system to apply electromagnetic power to the surface of the food at a dynamically controlled energy transfer rate. The quantifiable cooking result can include Maillard reaction in at least one target region of the food and the undesirable cooking result includes pyrosis, charring, dryness, or any combination thereof.

The following are non-limiting examples of embodiments:

Example 1: A cooking instrument comprising: a power supply electrically coupled to an external power source having an upper power draw limit; a heating system electrically coupled to the power supply and capable of generating electromagnetic emission to cook; a cooking chamber adapted to store food at least when the heating system is operational; a computer readable memory storing a mapping function specifying one or more parameters associated with driving the heating system to achieve a quantifiable cooking result; and a control system configured to select a quantifiable cooking result and control, based on the mapping function, driving signals provided to the heating system to achieve the quantifiable cooking result, wherein controlling the driving signals thereby increases power density of the electromagnetic emission that the food is exposed to while the heating system consumes substantially equivalent power from the external power source as compared to another mode of operation of the heating system.

Example 2: Similar or same as example 1, wherein increasing the power density includes selecting a power transfer pathway that transfers more of the power provided from the heating system to the food compared to another power transfer pathway, managing temperature of one or more heating elements in the heating system, mechanically moving at least a portion of the heating system, mechanically moving at least a portion of the food, or any combination thereof.

Example 3: Similar or same as example 2, wherein selecting the power transfer pathway includes selecting and driving a heating element in the heating system that is aligned with one or more optical elements that change the electromagnetic emission generated from the heating system, wherein such change includes changes in intensity, direction, spectral distribution, or any combination thereof.

Example 4: Similar or same as example 2, further comprising a cooking platform; wherein selecting the power transfer pathway includes selecting and driving a heating element to directly heat the cooking platform with electromagnetic power that is absorbable by the cooking platform, wherein the cooking platform is adapted to absorb the electromagnetic power from the heating element as heat and conductively transfer such heat to the food.

Example 5: Similar or same as example 2, wherein selecting the power transfer pathway includes selecting and driving a heating element in the heating system that has a directional filament coating to promote higher efficiency of electromagnetic power generation in a particular direction.

Example 6: Similar or same as example 2, wherein selecting the power transfer pathway includes selecting and driving a heating element with an emission surface area that passively grows over time; and wherein the control system is configured to achieve the quantifiable cooking result according to the mapping function by utilizing passively changing power density due to the passively growing emission surface area.

Example 7: Similar or same as example 1, wherein the control system is configured to control the driving signals to exploit one or more power density increasing mechanisms.

Example 8: Similar or same as example 7, wherein the power density increasing mechanisms are static structures that can be selectively used by the control system.

Example 9: Similar or same as example 1, wherein the quantifiable cooking result includes temperature or spatial temperature distribution measurable by a temperature probe, a sear level as identified in an image provided to or a particulate analysis performed by the control system, a temporal rate of change of temperature to at least a portion of the food, a moisture content as identified by a moisture sensor provided to the control system, or any combination thereof.

Example 10: Similar or same as example 1, wherein, in a searing mode, the heating system is configured by the control system to utilize bursts of electromagnetic power that are localized, the bursts being temporally spaced apart with durations of no power or reduced power as compared to each of the bursts.

Example 11: Similar or same as example 10, further comprising a sensor adapted to measure a physical attribute in the cooking chamber; wherein the control system is configured to configure a parameter of the bursts based on a measurement from the sensor while the heating system is operational in the searing mode, wherein the parameter includes power density of a burst, burst duration, burst separation duration, between-burst power density, selection of one or more heating elements associated one or more of the bursts, directionality of one or more of the bursts, a cessation of bursting, or any combination thereof.

Example 12: Similar or same as example 10, further comprising a sensor adapted to measure a physical attribute in the cooking chamber; where in the control system is configured to configure a parameter of the bursts based on their measurement from the sensor before the heating system is operational in the searing mode.

Example 13: Similar or same as example 1, wherein the control system is configured to achieve a uniform cooking result while driving the heating system with the increased power density by sequentially or simultaneously powering one or more heating elements of the heating system to spatially cover different regions of the food.

Example 14: Similar or same as example 13, wherein the control system is configured to achieve uniform power density in a target region of the food specified in the selected quantifiable cooking result through one or more optical elements that change direction of energy flow.

Example 15: Similar or same as example 1, wherein the control system is configured to apply power utilizing at least two heating elements of the heating system from different directions to heat the same target region on the food.

Example 16: Similar or same as example 2, wherein selecting the power transfer pathway includes selecting and driving a heating element that has an electromagnetic emitter and a reflector structure with at least two separated layers to redirect electromagnetic energy generated by the electromagnetic emitter.

Example 17: Similar or same as example 2, further comprising a cooking platform surface; wherein selecting the power transfer pathway includes selecting and driving a heating element that has a reflector with a thermally conductive structure such that energy absorbed by the reflector when the heating system is operational is conductively transferred to the cooking platform surface.

Example 18: Similar or same as example 2, wherein selecting the power transfer pathway includes selecting and driving a heating element that has an electromagnetic emitter and a reflector adapted to concentrate electromagnetic energy generated by the electromagnetic emitter.

Example 19: Similar or same as example 2, wherein selecting the power transfer pathway includes selecting and driving a heating element that has an electromagnetic emitter and a reflector, wherein the reflector is adapted to reflect electromagnetic energy from the electromagnetic emitter and to absorb and re-radiate at least a portion of the absorbed electromagnetic energy from the electromagnetic emitter.

Example 20: Similar or same as example 2, wherein selecting the power transfer pathway includes selecting and driving a heating element that has an electromagnetic emitter and a reflector, wherein the reflector includes an air conduit structure to direct convection current of heated air to the food.

Example 21: Similar or same as example 2, wherein selecting the power transfer pathway includes selecting and driving a heating element that has an electromagnetic emitter and a reflector, wherein the reflector is attached to the cooking chamber via a neck region such that the neck region is narrower than the reflector and a portion of the cooking chamber attached to the neck region.

Example 22: Similar or same as example 1, wherein the heating system includes multiple heating elements that have heterogeneous reaction times such that a first heating element has a faster reaction time, and wherein the electromagnetic emission of the first heating element has a smaller exposure area to the food storage location as compared to another heating element of the heating system.

Example 23: A cooking instrument comprising: a power supply electrically coupled to an external power source having an upper power draw limit; a cooking chamber adapted to include a food storage location for storing food at least while the power supply is on; a heating system, electrically coupled to the power supply, comprising multiple heating elements including a first heating element that produces electromagnetic emission having first electromagnetic emissivity in a first direction and having second electromagnetic emissivity in a second direction, wherein the first direction is toward the food storage location and wherein the first electromagnetic emissivity is higher than the second electromagnetic emissivity; a computer readable memory storing a mapping function specifying parameters associated with driving the heating system to achieve a quantifiable cooking result; and a control system configured to control power provided to the heating system, select a quantifiable cooking result corresponding to higher heat transfer to surface of the food compared to heat transfer to middle of the food and, in response to selecting the quantifiable cooking result, drive the heating system to achieve the quantifiable cooking result according to the mapping function, wherein driving the heating system includes powering the first heating element without powering all of the multiple heating elements.

Some embodiments of the disclosure have other aspects, features, structures, characteristics, and steps (collectively "elements") in addition to or in place of what is described above. These potential additions and replacements are described throughout the rest of the specification. Reference in this specification to "various embodiments" or "some embodiments" means that a particular element described in connection with the embodiment is included in at least one embodiment of the disclosure. Alternative embodiments (e.g., referenced as "other embodiments") are not mutually exclusive of other embodiments. Moreover, various elements are described which may be exhibited by some embodiments and not by others. Similarly, various requirements are described which may be requirements for some embodiments but not other embodiments.

Some embodiments of this disclosure reference an element sharing a similarly name or label of another element described in other examples or embodiments of the disclosure. References to such an element (even without figure numbering) means that the other element with substantially similar name or label is an open-ended example or potential replacement of the referenced element provided that such example and replacement is not inconsistent with the embodiment in question.

Some embodiments of the disclosure have other aspects, elements, features, and steps in addition to or in place of what is described above. These potential additions and replacements are described throughout the rest of the specification.

The invention claimed is:

1. A cooking instrument comprising:
a power supply electrically coupled to an external power source having an upper power draw limit;
a heating system electrically coupled to the power supply, the heating system comprising one or more heating elements, with each said heating element including a wavelength controllable filament assembly having an emission surface that changes over time, wherein the wavelength controllable filament assembly is configured to generate electromagnetic emission to cook;
a cooking chamber adapted to store food at least when the heating system is operational;
a computer readable memory storing a mapping function specifying one or more parameters associated with driving the heating system to achieve a quantifiable cooking result, wherein the mapping function provides a mapping between power applied to a first heating element of the one or more heating elements and a corresponding emission surface area of the first heating element; and
a control system configured to select the quantifiable cooking result and, during cooking, control, driving signals provided to the heating system to achieve the quantifiable cooking result based at least in part on the changing emission surface area of the first heating element in accordance with the mapping function, wherein controlling the driving signals thereby increases power density of the electromagnetic emission that the food is exposed to in a first mode of operation while the heating system consumes substantially equivalent power from the external power source as compared to another mode of operation of the heating system and wherein increasing the power density includes managing temperature of the one or more heating elements in the heating system.

2. The cooking instrument of claim 1, wherein the control system is further configured to receive an image of the food and identify a food profile based on the image, wherein the control system is configured to control the driving signals further based on the food profile, wherein increasing the power density further includes mechanically moving at least a portion of the heating system or mechanically moving at least a portion of the food.

3. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element in the heating system that is aligned with one or more optical elements that change the electromagnetic emission generated from the heating system, wherein such change includes changes in intensity, direction, spectral distribution, or any combination thereof.

4. The cooking instrument of claim 1, further comprising a cooking platform; wherein increasing the power density further includes selecting a power transfer pathway that transfers more of the power provided from the heating system to the food compared to another power transfer pathway, wherein selecting the power transfer pathway includes selecting and driving a heating element to directly heat the cooking platform with electromagnetic power that is absorbable by the cooking platform, wherein the cooking platform is adapted to absorb the electromagnetic power from the heating element as heat and conductively transfer such heat to the food.

5. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element in the heating system that has a directional filament coating to promote higher efficiency of electromagnetic power generation in at least one particular direction.

6. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element of the one or more heating elements with a corresponding emission surface area that increases as its operating temperature increases and, when selecting the power transfer pathway, is larger than a corresponding emission surface area of another heating element according to the mapping function; and wherein the control system is configured to achieve the quantifiable cooking result according to the mapping function by utilizing passively changing power density due to the passively growing emission surface area of a filament within the heating element.

7. The cooking instrument of claim 1, wherein increasing the power density further includes mechanically moving at least a portion of the food.

8. The cooking instrument of claim 7,
wherein the control system is configured to predict an increase in power density as a function of the emission surface area based on the mapping function; and
wherein (a) the mapping function maps between the power applied and the changing emission surface area, (b) the mapping function maps between the power applied and the temperature, and/or (c) the mapping function maps between the temperature and the changing emission surface area.

9. The cooking instrument of claim 1, further comprising:
a camera attached to an interior of the cooking chamber, wherein the camera is configured to capture images of the interior of the cooking chamber; and
a display attached to the cooking chamber, wherein the display is configured to display the images, wherein the quantifiable cooking result includes temperature or spatial temperature distribution measurable by a temperature probe, a sear level as identified in an image provided to or a particulate analysis performed by the control system, a temporal rate of change of temperature to at least a portion of the food, a moisture content as identified by a moisture sensor provided to the control system, or any combination thereof.

10. The cooking instrument of claim 1, wherein, in a searing mode, the heating system is configured by the control system to utilize bursts of electromagnetic power that are localized, the bursts being temporally spaced apart by durations of no power or reduced power as compared to power emitted in each of the bursts.

11. The cooking instrument of claim 10, further comprising a sensor adapted to measure a physical attribute in the cooking chamber; wherein the control system is configured to configure a parameter of the bursts based on a measurement from the sensor while the heating system is operational in the searing mode, wherein the parameter includes power density of a burst, burst duration, burst separation duration, between-burst power density, selection of one or more heating elements associated one or more of the bursts, directionality of one or more of the bursts, a cessation of bursting, or any combination thereof.

12. The cooking instrument of claim 10, further comprising a sensor adapted to measure a physical attribute in the cooking chamber; where in the control system is configured to configure a parameter of the bursts based on their measurement from the sensor before the heating system is operational in the searing mode.

13. The cooking instrument of claim 1, wherein the control system is configured to achieve a uniform cooking result while driving the heating system with the increased power density by sequentially or simultaneously powering the one or more heating elements of the heating system to spatially cover different regions of the food.

14. The cooking instrument of claim 13, wherein the control system is configured to achieve uniform power density in a target region of the food specified in the selected quantifiable cooking result through one or more optical elements that change direction of energy flow.

15. The cooking instrument of claim 1, wherein the control system is configured to apply power utilizing at least two heating elements of the heating system from different directions to heat the same target region on the food.

16. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element that has an electromagnetic emitter and a reflector structure with at least two separated layers to redirect electromagnetic energy generated by the electromagnetic emitter.

17. The cooking instrument of claim 1, further comprising a cooking platform surface; wherein increasing the power density further includes selecting a power transfer pathway that transfers more of the power provided from the heating system to the food compared to another power transfer pathway, wherein selecting the power transfer pathway includes selecting and driving a heating element that has a reflector with a thermally conductive structure such that energy absorbed by the reflector when the heating system is operational is conductively transferred to the cooking platform surface.

18. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element that has an electromagnetic emitter and a reflector adapted to concentrate electromagnetic energy generated by the electromagnetic emitter.

19. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element that has an electromagnetic emitter and a reflector, wherein the reflector is adapted to reflect electromagnetic energy from the electromagnetic emitter and to absorb and re-radiate at least a portion of the absorbed electromagnetic energy from the electromagnetic emitter.

20. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element that has an electromagnetic emitter and a reflector, wherein the reflector includes an air conduit structure to direct convection current of heated air to the food.

21. The cooking instrument of claim 1, wherein increasing the power density further includes selecting a power transfer pathway that transfers more of the power provided from the heating system to the food compared to another power transfer pathway, wherein selecting the power transfer pathway includes selecting and driving a heating element that has an electromagnetic emitter and a reflector, wherein the reflector is attached to the cooking chamber via a neck region such that the neck region is narrower than the reflector and a portion of the cooking chamber attached to the neck region.

22. The cooking instrument of claim 1, wherein the heating system includes multiple heating elements that have heterogeneous reaction times such that the first heating element has a faster reaction time, and wherein the electromagnetic emission of the first heating element has a smaller exposure area to the food storage location as compared to another heating element of the heating system.

* * * * *